United States Patent [19]
Morimoto et al.

[11] Patent Number: 5,784,059
[45] Date of Patent: Jul. 21, 1998

[54] VEHICLE NAVIGATION SYSTEM WITH DESTINATION SELECTION USING HIERARCHICAL MENU ARRANGEMENT WITH SELECTIVE LEVEL SKIPPING

[75] Inventors: Kyomi Morimoto, Nishio; Kazuteru Maekawa, Aichi-ken; Yukiyoshi Suzuki, Okazaki; Hitoshi Asano, Nagoya; Hiroyuki Kanemitsu, Susono; Syuzo Moroto, Anjo, all of Japan

[73] Assignee: Aisin AW Co., Ltd., Japan

[21] Appl. No.: 497,251

[22] Filed: Jun. 30, 1995

[30] Foreign Application Priority Data

Sep. 16, 1994 [JP] Japan .................. 6-248726
Sep. 22, 1994 [JP] Japan .................. 6-254440

[51] Int. Cl.⁶ .................. G06F 3/14; G06F 17/00
[52] U.S. Cl. .................. 345/353; 345/357; 345/333; 701/209; 701/208; 340/995
[58] Field of Search .................. 395/353, 352, 395/333, 334, 356, 357; 340/995, 990, 989; 364/449.2, 449.3, 449.5, 443; 345/353, 352, 333, 334, 356, 357; 701/208, 209, 211, 200

[56] References Cited

U.S. PATENT DOCUMENTS

| | | | |
|---|---|---|---|
| 5,243,697 | 9/1993 | Hoeber et al. | 345/334 |
| 5,420,975 | 5/1995 | Blades et al. | 345/334 |
| 5,463,727 | 10/1995 | Wiggins et al. | 345/353 |
| 5,537,324 | 7/1996 | Nimura et al. | 701/208 |
| 5,546,523 | 8/1996 | Gatto | 345/352 |
| 5,559,945 | 9/1996 | Beaudet et al. | 345/353 |
| 5,588,107 | 12/1996 | Bowden et al. | 345/356 X |

*Primary Examiner*—Raymond J. Bayerl
*Attorney, Agent, or Firm*—Lorusso & Loud

[57] ABSTRACT

To improve the efficiency of a menu selecting operation, not only a menu of a predetermined hierarchy, but also at least one menu of a lower hierarchy corresponding to the predetermined hierarchy are displayed. If the lower hierarchy (first genre) menu is selected, the nationwide and individual state or region menus of the first genre are instantly displayed. If, on the other hand, the menu of predetermined hierarchy is selected from the main menu, individual genre menus of the same hierarchy as that of the lower hierarchy menu are displayed to enable selection of a different genre menu. The nationwide and state or regions menus of the selected genre are then displayed (at S8). As a result, the operation efficiency for selecting the first genre can be improved. Provision is also made for destination selection by input of a telephone number. A match of the input telephone number with prestored data calls up display of a map of the vicinity of the address corresponding to the input telephone number, which map display can be utilized to set a destination. On the other hand failure to match the input telephone number with prestored data results in a display of landmarks located within the larger area assigned to the local exchange portion of the input telephone number. One of the display listed landmarks may then be selected to call up a map of the vicinity of the selected landmark.

9 Claims, 21 Drawing Sheets

FIG. II

VEHICLE NAVIGATION SYSTEM WITH DESTINATION SELECTION USING HIERARCHICAL MENU ARRANGEMENT WITH SELECTIVE LEVEL SKIPPING

BACKGROUND OF THE INVENTION

1. Field of the Invention

The present invention relates to a technique for hierarchically displaying menus for input of instructions in accordance with selections from displayed menus.

2. Prior Art

The vehicular navigation system disclosed in Japanese Laid-Open Publication No. 173820/1989 (published, unexamined application) contains a hierarchy of menus consisting of several levels of menus to be selected by touching the screen display, which menus are hierarchically displayed for convenience of selection input, through which an operator must progress to select a destination as shown in FIG. 11 of the publication. Specifically, a plurality of general menu categories ("genres") are first listed and displayed as a menu forming a first level of menu hierarchy (as shown at in FIG. 11 of the publication). When any one of the genre categories of the general menu is selected, there is displayed one menu of a plurality of menus forming a second level of the menu hierarchy; the displayed second level menu listing more specific menu categories under the selected category of the first level menu. The names of a plurality of registered points within the selected genre are then listed and displayed as a menu of a subsequent hierarchy (as shown at in FIG. 11 of the publication). When any one of the registered points is selected, the position of the selected point is set as the destination on the basis of the data stored in a storage unit.

However, in the prior art vehicular navigation system disclosed in the aforementioned Japanese application, even a registered point which has been repeatedly set many times as the destination, requires at least two operations for its selection. Specifically, a genre is first once selected from the menu hierarchy of genres, and then a menu of the registered points belonging to that selected genre is displayed from which a menu of registered points is further selected.

In general, the vehicular navigation systems frequently employ a small screen, of a size dictated by the space-limited compartment provided therefor in the dashboard. Therefore, display of a menu of registered points often requires use of a plurality of screens, which are switched responsive to input of a screen switching instruction. As a result, after the menu from the genre menu is selected to display a listing of registered points (locations, landmarks, etc.) that portion of the menu listing the desired registered point must be located from within the total menu of all the registered points. This frequently makes it necessary to input screen switching instructions many times for switching the screens.

Japanese Patent Laid-Open No. 19684/1993 discloses a vehicular navigation system wherein the toll number portion or local exchange portion of a telephone number is input (as in a toll office inputting mode), and the toll number data in memory and the map data of the area corresponding to the toll number data are processed to display a map of the area assigned to the input toll number portion of the input telephone number. Thus, the operator is conveniently able to obtain display of a map showing the destination merely by knowing the toll number portion of the telephone number of the destination, even if he does not remember the precise location position or address of the destination. In this prior art vehicular navigation system, when the telephone number is inputted (as in a telephone number inputting mode), the telephone number data in the memory and the map data corresponding to the telephone number data are retrieved and processed to generate a display of a map of the vicinity around the point corresponding to the inputted telephone number so that the operator may conveniently set and input the destination. However, the displayed map covers a wide area which is assigned to the inputted toll number, so that it is not easy to locate the desired destination on the map. Even if the position of the desired destination is located on the wide area map, there arises another problem in that complicated operations are frequently required to switch the map to a detailed map having a high reduction scale and to repeatedly scroll the map screen to confirm the desired destination on the displayed map.

In the prior telephone number inputting system described above, if the input telephone number is not stored as telephone number data in the memory, the position corresponding to the telephone number cannot be retrieved and, accordingly, no map for the vicinity around the location corresponding to the input telephone number can be displayed.

SUMMARY OF THE INVENTION

Accordingly, an object of the present invention is to improve the efficiency of menu selection by displaying on a display screen, not only a menu of a predetermined hierarchy, but also at least one of menu of a lower hierarchy corresponding to the former menu.

Another object is to further simplify the selection process involved in destination setting by determining the menu of the lower hierarchy to be displayed on the basis of learning the results of previous menu selections.

Yet another object of the invention is to provide a vehicular guidance information outputting system which has its operating efficiency improved by provision of a hierarchical menu, by displaying not only the menu of a predetermined hierarchy but also at least one menu of a lower hierarchy corresponding to the former menu.

Another object is to retrieve the desired destination location conveniently by selecting and displaying a landmark in an area corresponding to a telephone number input by the operator.

Yet another object is to make it possible to display and select a landmark in the neighborhood of a point and/or an area corresponding to the inputted location related information, even if the inputted location is not stored in memory.

To satisfy the foregoing objectives and to overcome the above-noted problems with the prior art systems, the present invention provides an improved instruction inputting system with a hierarchical menu selection scheme. In one embodiment (FIG. 1(A)), the system of the present invention includes a display unit for displaying information including selectable items of a menu and a storage unit for storing data including a hierarchical arrangement of a plurality of menus in at least three levels wherein (a) a first level of the hierarchical arrangement includes a first level menu having a plurality of selectable items of general categories, (b) a second level of the hierarchical arrangement includes a plurality of second level menus each having a plurality of selectable items of more specific categories, each second level menu relating to a corresponding general category of the first level menu, and (c) a third level of the hierarchical arrangement includes a plurality of third level menus each having a plurality of selectable items of instructions, each third level menu relating to a corresponding specific category of a menu of the second level menus. The first, second and third levels of the hierarchical arrangement define progressively lower levels.

The first embodiment of the present invention (FIG. 1(A)) further includes input means for selecting an item from a menu displayed by the display unit and first, second, third and fourth control means. The first control means responds to selection of an item of instruction of the third level by the input means by executing a corresponding instruction. The second control means operates the display unit to display selectable items including a menu of selectable items of the hierarchical arrangement. The third control means controls the second control means to display successive menus of selectable items based upon the data stored in the storage unit and in accordance with the hierarchical arrangement beginning with the first level and progressing sequentially to the second and third levels in response to corresponding items input by the input means. The fourth control means responds to the display of a higher level menu for controlling the second control means to display a selectable item of a lower level menu based upon predetermined information to enable selection of said selectable lower level menu item by said input means to bypass one or more lower levels of menus.

In a second preferred embodiment (FIG. 1(B)), the system of the present invention further includes learning means for learning, each time one of the plurality of menus in a lower hierarchy level is selected by input of a select instruction from said input means, the identity of that selected menu. In this preferred embodiment, the predetermined information, which controls operation of the fourth control means, is composed of the information learned by the learning means and the fourth control means controls the second control means, on the basis of that learned information, to simultaneously display on said display screen both the menu of predetermined hierarchy and at least one of the plurality of menus of the lower hierarchy level corresponding to the menu of predetermined hierarchy.

In another aspect the present invention provides: a display unit for displaying a menu on a screen, a storage unit for storing data in a hierarchical structure including data for a plurality of menus correlated with instruction data corresponding to the menus, an input unit for inputting a select instruction to select a menu identified on a main menu display screen, and a control unit for executing the input instruction. The main menu display screen simultaneously shows first select means for selecting a menu of a predetermined hierarchy and second select means for selecting, in the alternative, at least one of a plurality of menus of a lower hierarchy corresponding to said menu of predetermined hierarchy, the first and second select means serving as the input unit.

In another aspect the present invention provides a hierarchical menu method of inputting instructions which employs: a display unit for displaying information including selectable items of a menu; a storage unit for storing data including a hierarchical arrangement of a plurality of menus in at least three levels wherein (a) a first level of the hierarchical arrangement includes a first level menu having a plurality of selectable items of general categories, (b) a second level of the hierarchical arrangement includes a plurality of second level menus each having a plurality of selectable items of more specific categories, each second level menu relating to a corresponding general category of the first level menu, and (c) a third level of the hierarchical arrangement includes a plurality of third level menus each having a plurality of selectable items of instructions, each third level menu relating to a corresponding specific category of a menu of the second level menus; said first, second and third levels of the hierarchical arrangement defining progressively lower levels; an input unit for selecting an item from a menu displayed by the display unit; and a control unit for executing, responsive to selection of an item of instruction of the third level by the input means, a corresponding instruction. The method of the present invention includes: displaying selectable items including a menu of selectable items of the hierarchical arrangement; displaying a selectable lower level menu item based upon predetermined information when said displayed menu is a higher level menu; inputting item selections from the input means; operating the control unit when the input item selection is an item of instruction of the third level; and displaying a lower level menu of selectable items when the input item selection is a general category of the first level or a more specific category of the second level.

In the preferred embodiment the method of the present invention further includes learning the identity of the selected menu, each time any of the plurality of menus in the lower hierarchy, corresponding to the menu of said predetermined hierarchy, is selected by input of a select instruction from said input means, the one menu of lower hierarchy selectable by the second select means being the menu of learned identity.

The instruction inputting system of the present invention is particularly advantageous in a vehicular navigation system which reads guidance data from data stored in a storage unit, on the basis of an input instruction or running of the vehicle.

According to the invention, in the first and second embodiments the second control means displays the menu on the display unit on the basis of the data stored in the memory unit. In the presence of a next hierarchical menu corresponding to the menu selected by each select instruction inputted from the input means, the third control means controls the second control means on the basis of the inputted select instruction, to display the next hierarchical menu in the display unit. In the absence of said next hierarchical menu, the third control means inputs an instruction corresponding to the menu selected by the select instruction, to the first control means on the basis of the data which is stored in the storage unit.

At this time, on the basis of predetermined information, the fourth control means controls the second control means to display in the display unit, not only a menu in a predetermined hierarchy, but also at least one of a plurality of menus in a lower hierarchy corresponding to the former menu.

According to the invention the learning means learns, each time any of the plurality of menus in the lower hierarchy corresponding to the menu of the predetermined hierarchy is selected by inputting the select instruction from the input means, the menu which is selected by the inputted select instruction. On the basis of the learning result, moreover, the fourth control means controls the second control means to display in the display unit, not only the menu in the predetermined hierarchy, but also at least one of the plurality of menus in the lower hierarchy corresponding to the former menu.

The main menu is displayed in the display unit on the basis of the data stored in the storage unit. Then, in the presence of a next hierarchical menu corresponding to the menu most selected by input from the input means, the next hierarchical menu is displayed on the display unit on the basis of the data stored in the storage unit. In the absence of said next hierarchical menu, on the other hand, an instruction corresponding to the menu selected by the input select instruction is inputted to the control unit on the basis of the data stored in the storage unit.

At this time, not only a menu of a predetermined hierarchy, but also at least one of a plurality of menus corresponding to the former menu is displayed in the display unit on the basis of the predetermined information and the data stored in the storage unit.

A third embodiment of the invention (FIG. 1(C)) provides a location retrieving system for retrieving a location predetermined to correspond to an input telephone number, including: input means for inputting a telephone number; storage means for storing concordance information relating telephone numbers to landmarks within areas corresponding to the telephone numbers, landmark display data for displaying said landmark, and landmark location data indicating the locations of the landmarks; display means for displaying a landmark predetermined for the area corresponding to the input telephone number on the basis of said landmark display data; control means for retrieving, responsive to the input telephone number, the landmark display information to display the landmark for the area corresponding to the input telephone number; select means for inputting a select signal to select a landmark, from among a plurality identified on a display screen, to be displayed by said display means; and retrieve means for retrieving the location of the landmark, which is selected by the select signal inputted by said select means, on the basis of the landmark position information.

More broadly, the third embodiment provides a location retrieving system for retrieving a location predetermined to correspond to input point or area location related information, which system includes: input means for inputting the location related information; storage means for storing point location information indicating the location of the point and/or the area, concordance information correlating the point location information with the input point or area location related information, landmark display information for displaying a landmark in the neighborhood of the point and/or the area corresponding to (correlated with) the location related information, and landmark position information indicating the location of the landmark; display means for displaying the landmarks in the area corresponding to the point and/or the area on the basis of said landmark display information; detect means for detecting, if the point location information, indicating the location of the point and/or the area corresponding to the input location related information, is stored in said storage means; control means for, responsive to a negative determination by said detect means, displaying landmarks in the neighborhood of the point and/or the area corresponding to said inputted position related information; select means for inputting a select signal for selecting any of the landmarks which are displayed by said display means; and retrieve means for retrieving the position corresponding to the selected landmark, on the basis of said landmark position information.

In the position retrieving, e.g. destination setting, system of this latter embodiment, when a telephone number is input by the input means and no data is found in said second storage means that corresponds to the subscriber portion of the input telephone number, the first control means displays landmarks in the area corresponding to the input local exchange portions of the telephone number in the display means by retrieving the landmark display information from the corresponding information stored in the first storage means. When the select signal for selecting one of the landmarks displayed by the display means is input from the select means, the retrieve means retrieves the position of the landmark selected by the input select signal, on the basis of the landmark position information stored in the first storage means.

More broadly, when the location related information corresponding to a point and/or area is input and the detect means determines that data for the location of the input point and/or area is stored in the storage means, a map for the vicinity of that location is provided for setting a destination of the displayed map. On the other hand, when the detect means determines that data indicating the location of the input point and/or the area is not stored in the storage means, the control means displays landmarks in the neighborhood of the point and/or the area corresponding to the inputted location related information, on the display screen on the basis of landmark display information retrieved from the storage means. Then, in response to a select signal for selecting one of the landmarks displayed by the display means, the retrieve means retrieves the position corresponding to the selected landmark from the storage means.

DESCRIPTION OF THE PREFERRED EMBODIMENTS

Figure 1A:
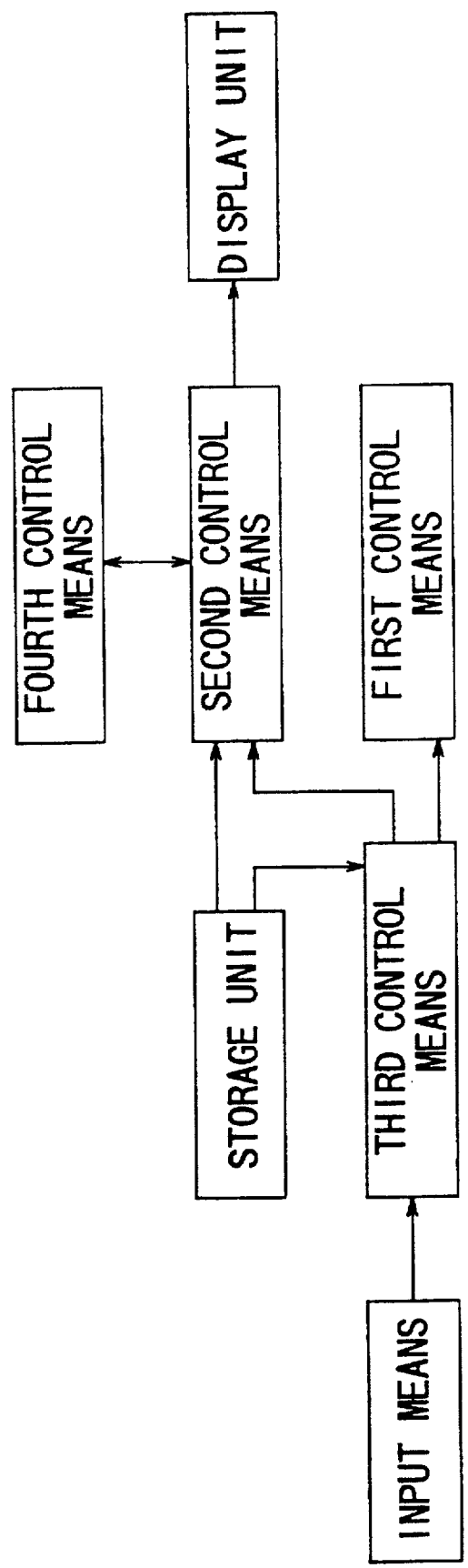
FIG. 1(A) is a block diagram of the first embodiment of the present invention.
Figure 1B:
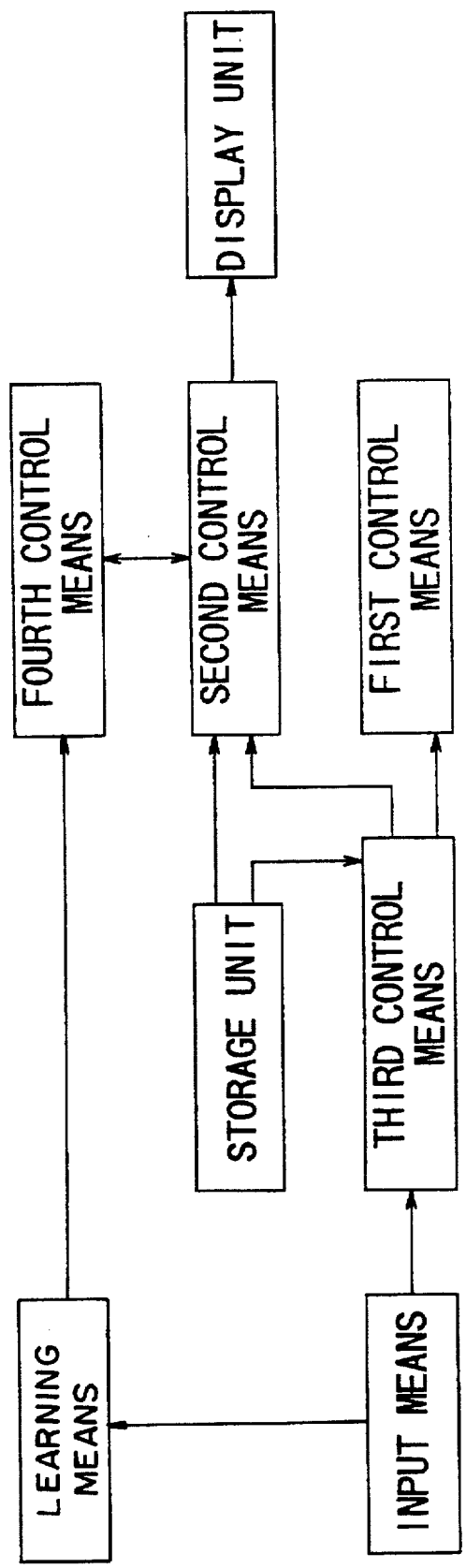
FIG. 1(B) is a block diagram of the second embodiment of the present invention.
Figure 1C:
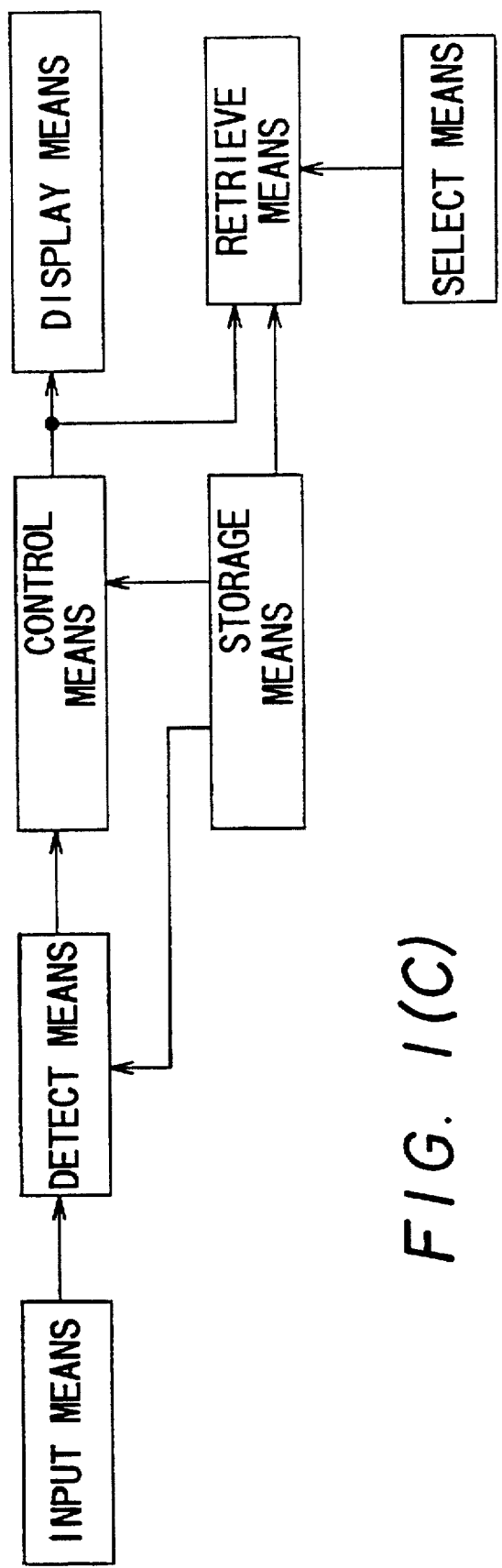
FIG. 1(C) is a block diagram of the third embodiment of the present invention.
Figure 2:
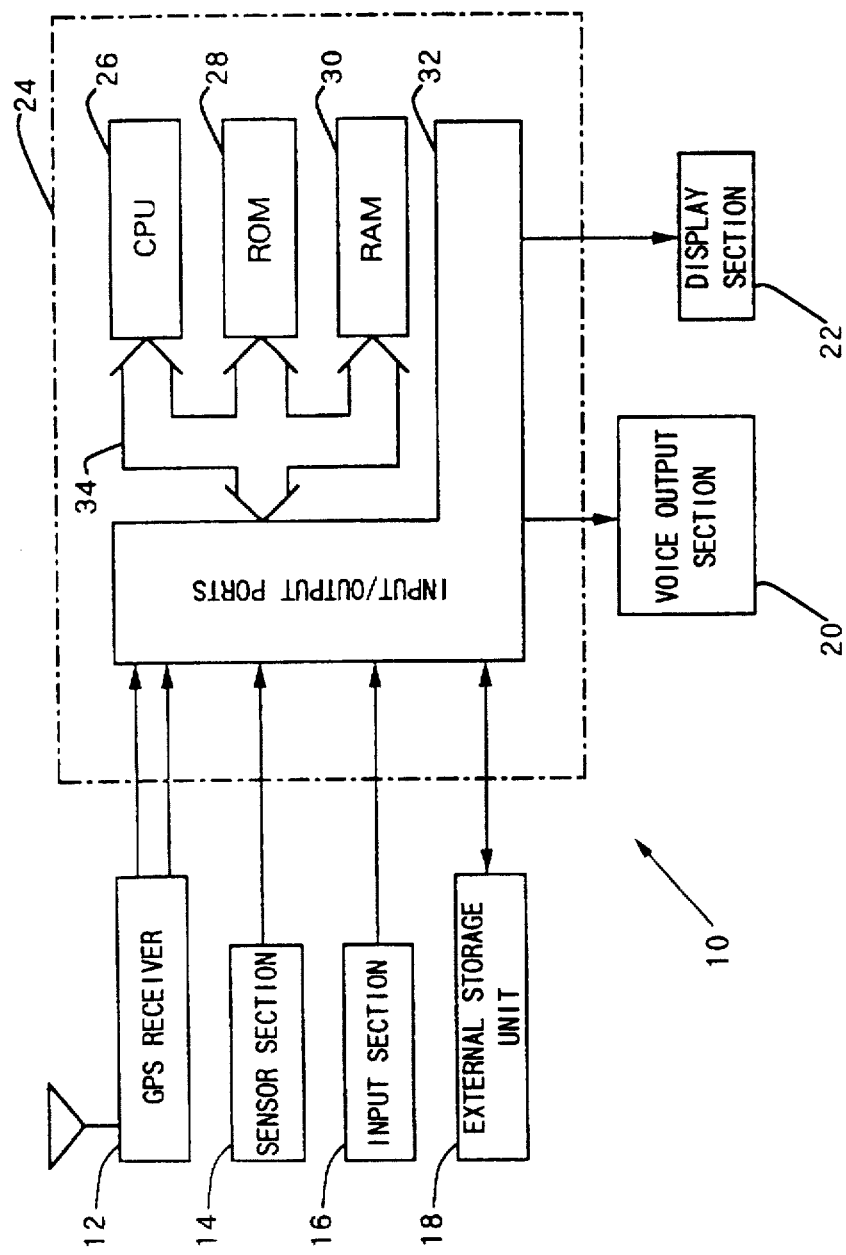
FIG. 2 is a block diagram of a navigation system utilizing the present invention.

The overall construction of the navigation system 10 of the present invention is shown in the block diagram in FIG. 2. The navigation system 10 is mounted on a vehicle for guidance of the vehicle from a point of departure to a desired destination by searching to determine the optimum route, by display guidance on a map and by suitable output of voice guidance.

Figure 3A:
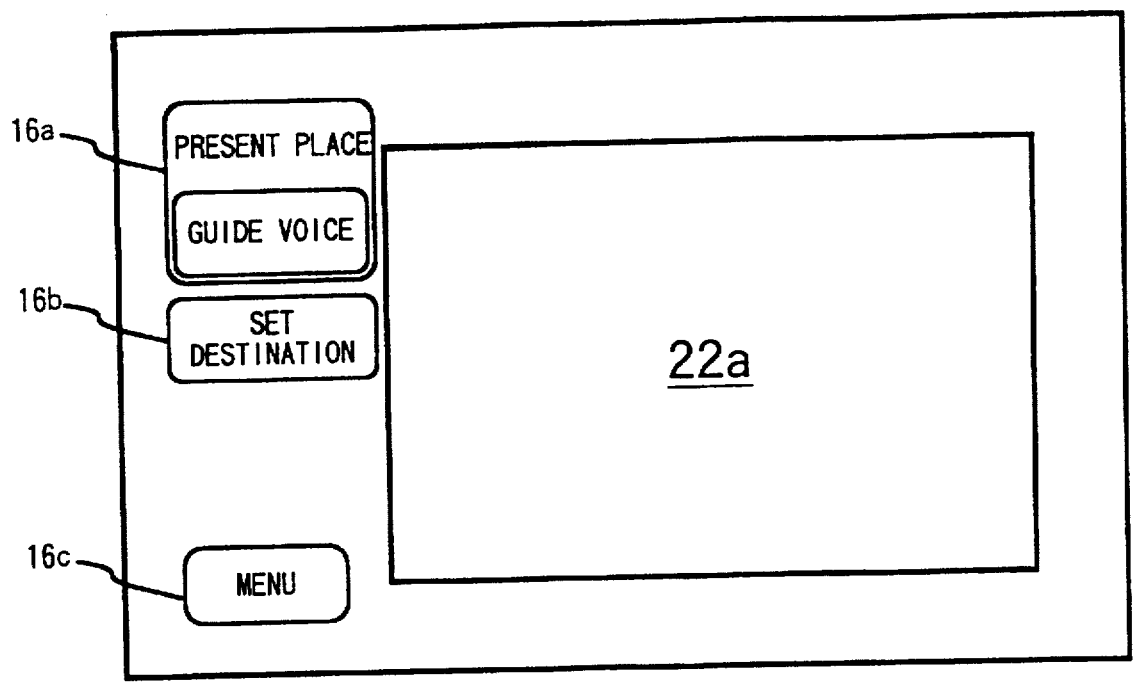
FIG. 3(A) is a schematic view of a first display screen of the present invention.
Figure 3B:
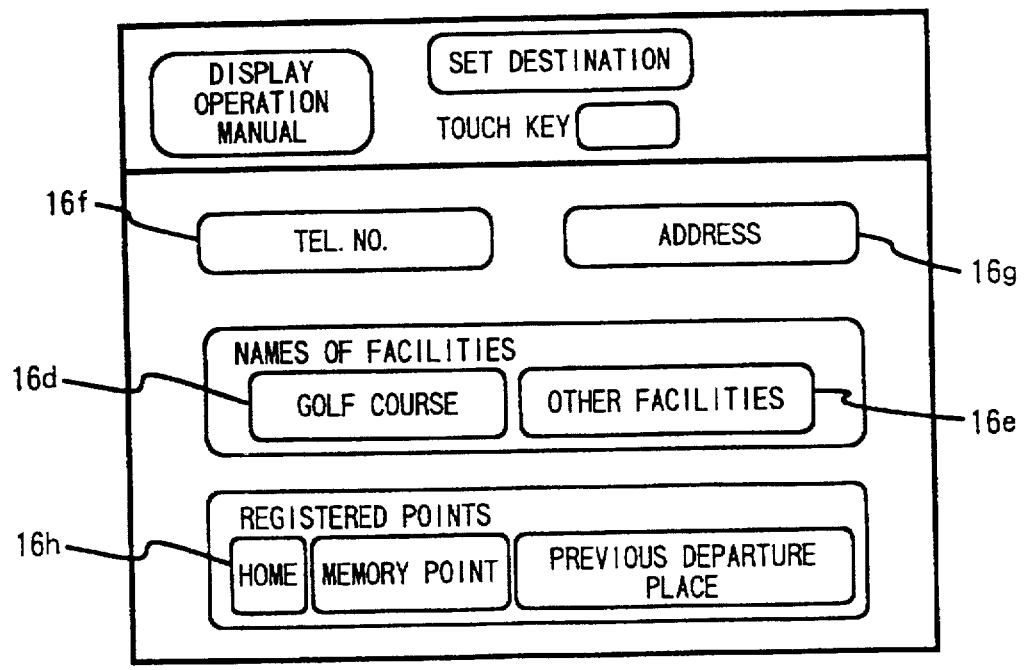
FIG. 3(B) is a schematic view of a second display screen of the present invention.

The display portion of the navigation system 10, as shown in FIGS. 3(A) and 3(B), is centrally disposed above the dashboard in the passenger compartment so that it can be easily seen from either the driver's seat or the navigator's seat.

As shown in FIG. 2, the navigation system 10 includes a conventional GPS receiver 12 for receiving the electric waves transmitted from an artificial satellite (NAVSTAR) for the GPS (Global Positioning System) for demodulating the frequencies of the received signals and transforming them for calculation of latitude, longitude and elevation. In this manner the position of the receiving point, i.e. the present position of the vehicle, can be determined and the vehicle velocity can be calculated. Based on the determined present position and calculated velocity a moving azimuth is generated. Sensor section 14 includes a distance sensor for detecting the distance travelled by the vehicle, a speed sensor for detecting the vehicle speed and a relative azimuth sensor such as a gyro or a left-hand/right-hand wheel sensor for detecting the relative azimuth of the vehicle, for locating the present position of the vehicle by outputting values individually according to the running distance, running velocity and advancing direction of the vehicle. Input section 16 (see FIG. 3A) includes button type switches or touch switches by which the operator inputs the departure point and desired destination and switches the display screen to obtain different information. An external storage unit 18 is composed of a CD-ROM disc, serving as a medium for various data stored in advance, and a CD-ROM drive for reading the data from the disc. A voice output unit 20 includes a speaker for outputting voice guidance and/or various message sounds, a voice processor for synthesizing the voice to be output from the speaker, and a digital analogue (D/A) converter. Display section 22 includes a display screen 22a, such as a CRT or LCD, and a display control circuit for displaying an image of a road map or the various messages on the display screen 22a. A control unit 24 reads selected data from the GPS receiver 12, the sensor section 14, the input section 16 and the external storage unit 18 and drives and controls the voice output unit 20 and the display section 22 on the basis of the read data.

The control section 24 is a conventional microcomputer which includes a CPU 26, a ROM 28, a RAM 30, input/output ports 32 and a bus line 34 connecting these elements. Incidentally, the RAM 30 is a conventional backup RAM which will not loose its stored data even if the navigation system 10 is turned OFF.

The button type switches of the input section 16, as shown in FIG. 3(A), include: a present location switch 16a, arranged to the side of the display screen 22a, for calling up a display of the present position on a map on the display screen 22a or for outputting guidance from the voice output unit 20; a destination setting switch 16b for starting the (later described) destination setting process by the control unit 24; and a menu switch 16c for displaying a menu on the display screen 22a.

Figure 7A:
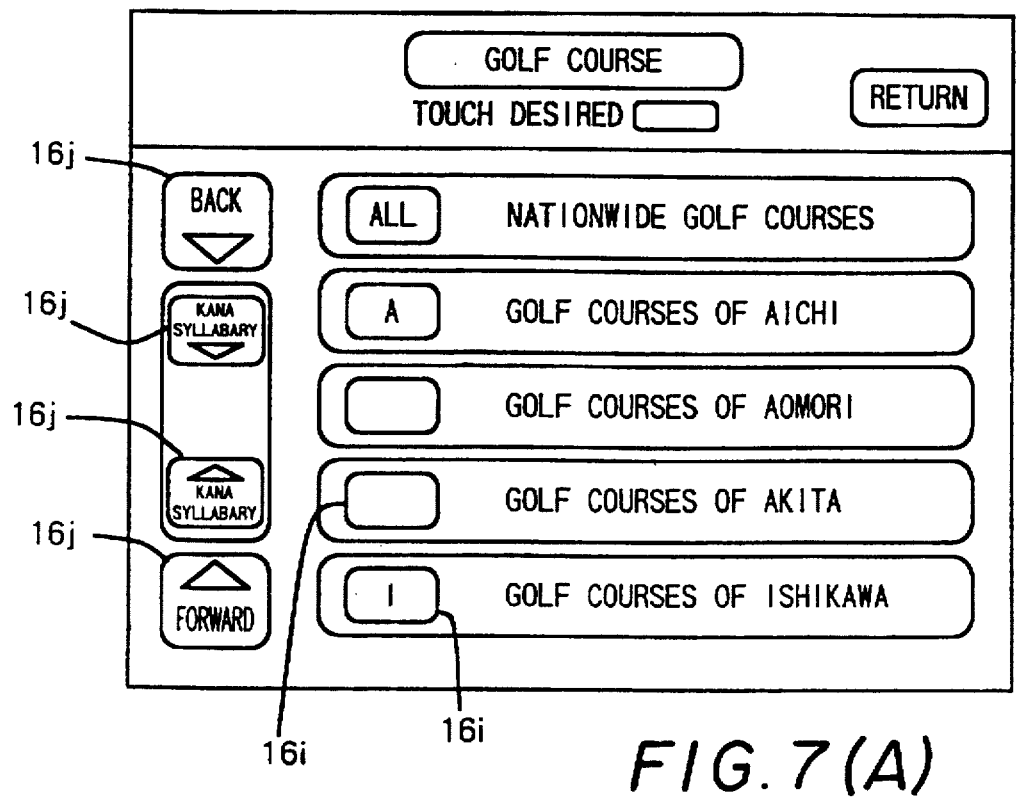
FIG. 7(A) is a schematic illustration of a third display screen of the present invention, of a lower hierarchy than the display screen of FIG. 3(B)
Figure 7B:
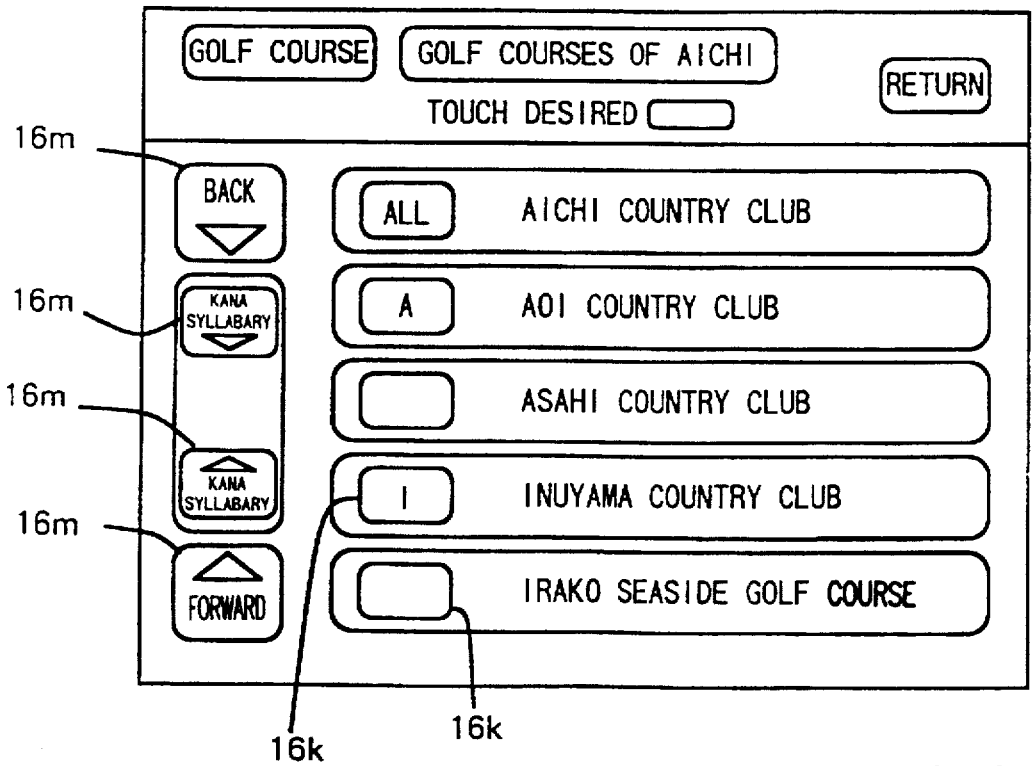
FIG. 7(B) is a schematic representation of a fourth display screen of the present invention, of a level of hierarchy lower than that of FIG. 7(A)
Figure 9A:
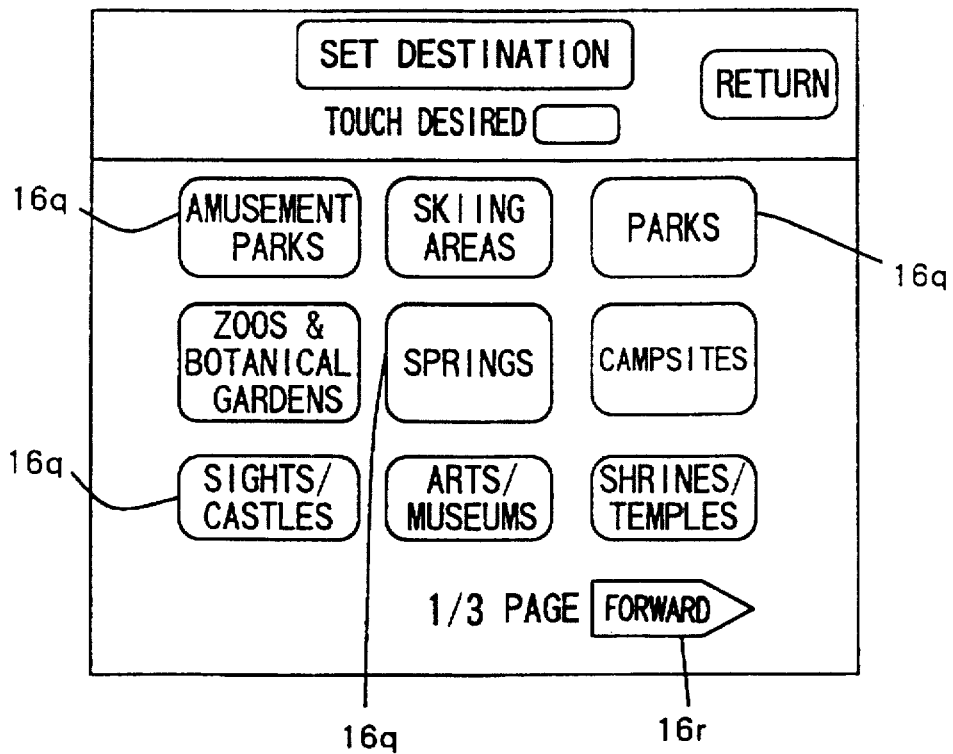
FIG. 9(A) is a sixth display screen of the present invention illustrating further selections at a level in the data hierarchy corresponding to FIG. 7(A)

The touch switches of the input section 16 are formed on the screen of the display screen 22a in such positions as to be visually recognized as rectangular keys and, in the conventional manner, their positions and functions are changed according to a change of the display on the display screen 22a. All the later-described menus are displayed in the form of touch switches, e.g. 16d, 16e, 16f, 16g, 16h and 16q as shown in FIG. 3(B) and FIG. 9(A), or together with touch switches 16i and 16k as shown in FIGS. 7(A) and 7(B), in the display 22a. A genre menu is selected by touching the corresponding touch switch on the main menu. Together, the touch switches for selecting menus function as the input means of the invention. Incidentally, in the following description, the reference characters indicating the menus displayed are identical to the reference characters indicating the corresponding touch switches.

Moreover, the CD-ROM disc (hereinafter referred to as the "disc"), acting as the storage medium of the external storage unit 18, stores: map data for displaying a map on the display screen 22a; intersection data indicating the position of an intersection; road data for roads connecting intersections; node data indicating the position of each point on the road; address data for various locations; and registered point data for information pertaining to points registered in advance and classified into predetermined genres. As used herein, the term "genre" includes, broadly, any classification convenient for the operator in searching for a desired destination. Suitable genres might include "AMUSEMENT PARKS", "STATIONS" AND "HOSPITALS", as exemplified in FIGS. 9(A), 9(B) and 9(C).

Figure 4:
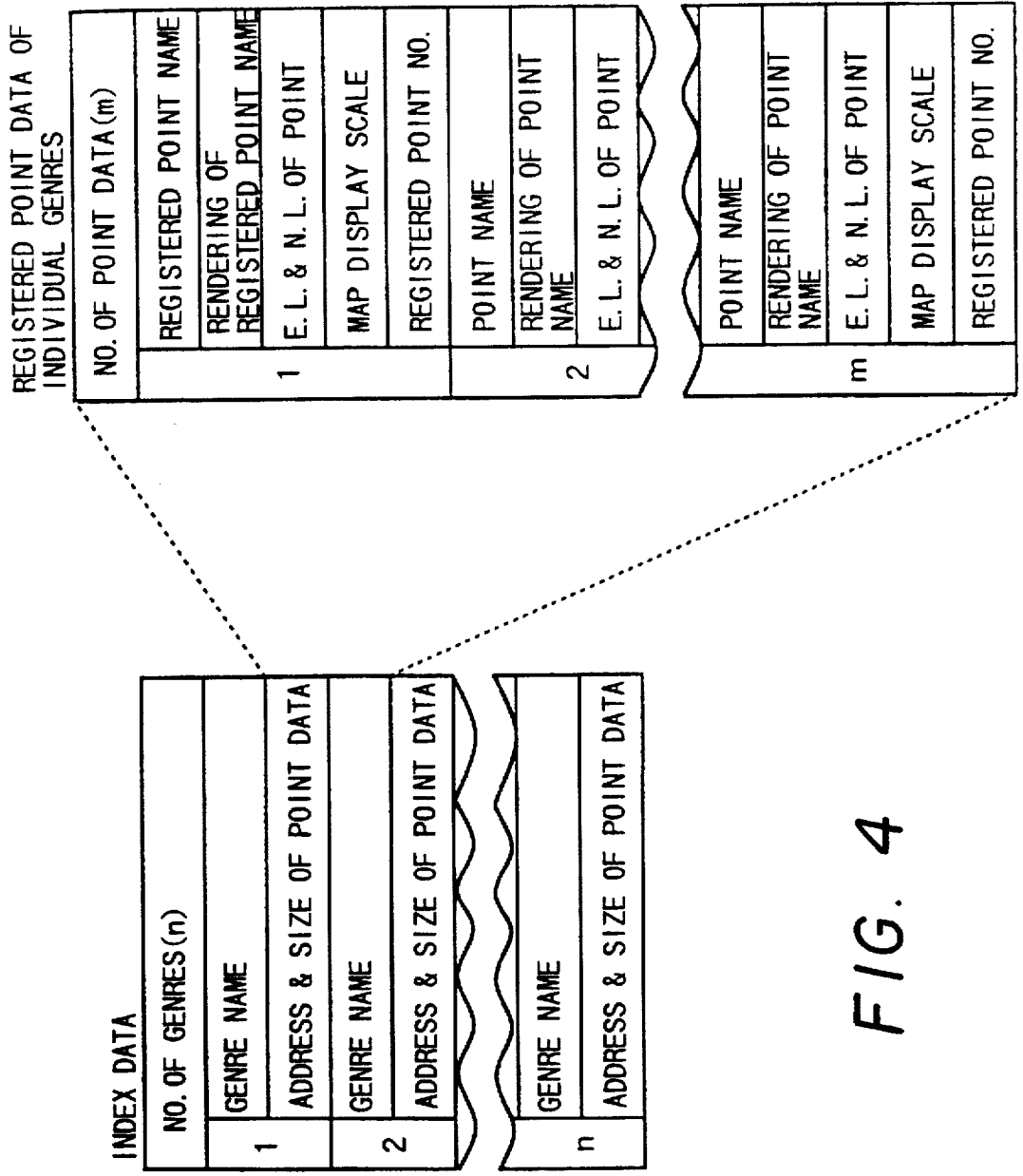
FIG. 4 is a chart illustrating the hierarchical data structure illustrated an example of hierarchal data structure which may be utilized in the first and second embodiments of the present invention.

The registered point data are arranged as shown in FIG. 4, in a hierarchical structure including: index data for retrieving the later-described registered point data for a specific genre from among the displayed the genre names on a menu presented on the display screen 22a; and registered point data for each genre for retrieving map data to display a map of the area in the vicinity of a registered point while displaying each registered point name in a menu on the display screen 22a.

At one level in the hierarchy are the index data composed of minimum unit data groups. Each data group, in turn, is composed of: genre name data indicating the name of each genre; and point data address & size data. The address data indicates the starting point on the disc, where the data group set (as shown in FIG. 4) for the registered points of a given genre are stored, and the size of point data indicate the storage capacity of same.

Such minimum unit data groups are n in number, i.e. the total number of genres constituting the entirety of the index data (as shown in FIG. 4).

At a lower level in the hierarchy are the registered point data for each genre in the form of minimum unit data groups, each data group being composed of: registered point name data indicating a specific name of a registered point, e.g. "TORANOMON INTERSECTION" in the genre "INTERSECTION"; registered point name rendering data for enumerating, listing and displaying the names of the registered points, e.g. in the KANA syllabic order as shown in FIG. 7(B), as will be described hereinafter; point E.L. & N.L. data indicating the position of the registered point; map display scale data indicating the scale of the map for the vicinity of the point position if in a reduced scale; and registered point number data indicating a registered number for reading out other data providing more detailed information pertaining to the registered point. Moreover, these minimum unit data groups are individually provided for the geographical jurisdiction such as state or prefecture in which the registered point is located, so that a menu of specific states or prefectures can be displayed, as exemplified in FIG. 7(A).

A plurality of minimum unit data groups relating to registered points classified within the same genre are gathered to form a set of data groups having consecutive addresses on the disc, the data group set composed of an m number of data groups as exemplified in FIG. 4, and n number of such data groups sets constitute the entirety of the registered point data of each genre.

Figure 5:
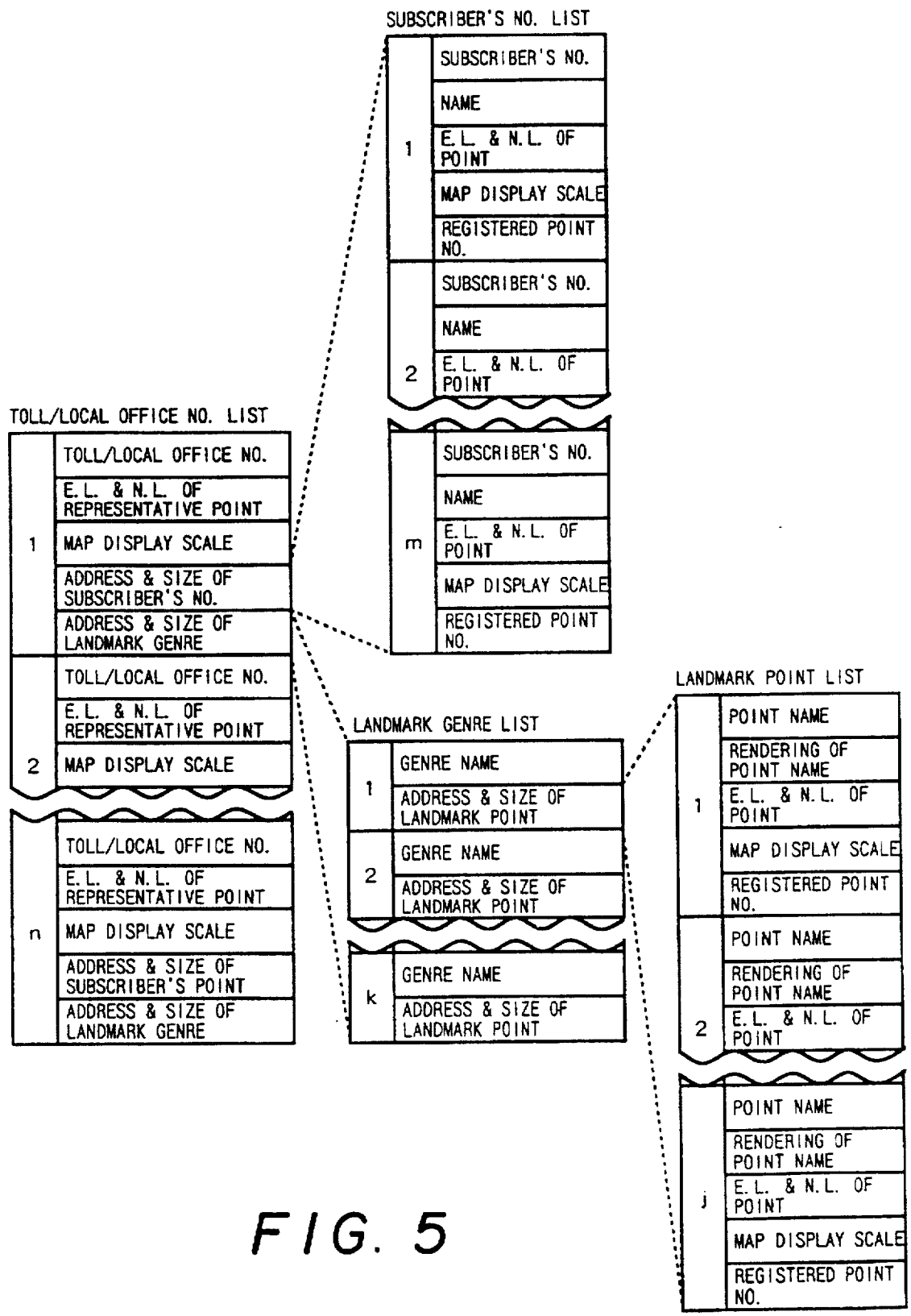
FIG. 5 is a chart illustrating another hierarchal data structure utilizable in all three embodiments of the present invention.

FIG. 5 illustrates an embodiment of a hierarchial data structure wherein the index genre are toll/local numbers 1 through n and a landmark genre existing in the area assigned to the same toll/local office number, are gathered to form a set of data groups k in number and consecutive in address in the recording medium of the external storage unit 18.

Figure 19A:
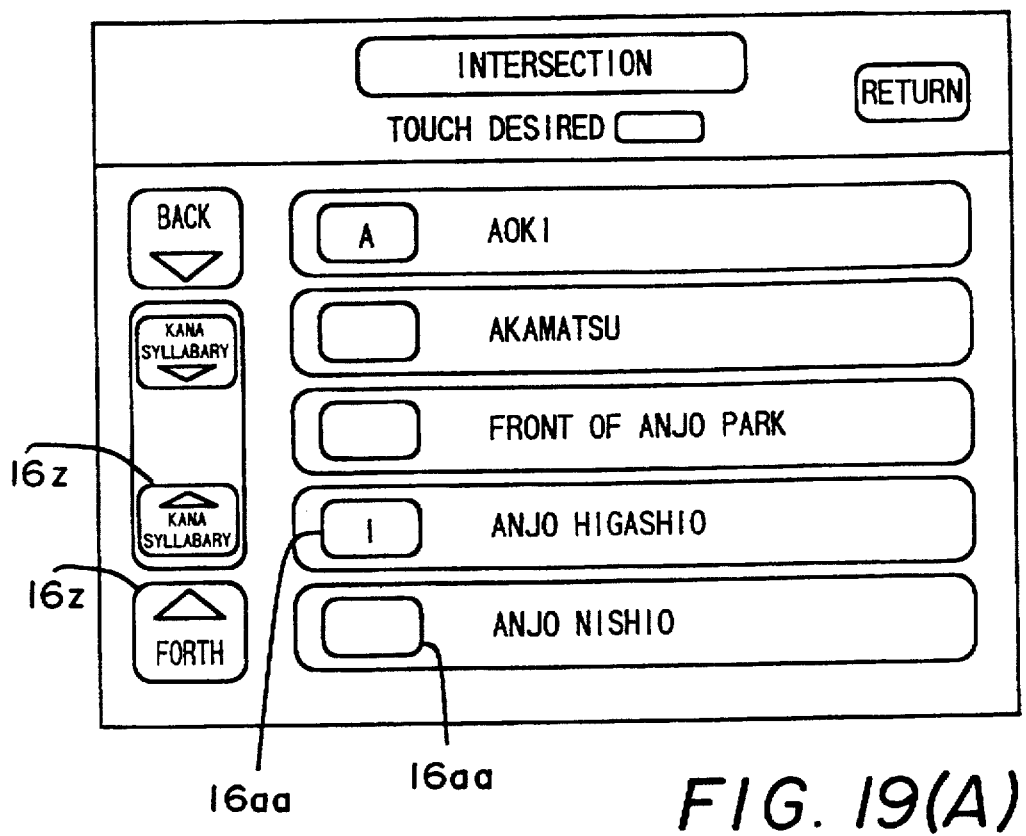
FIG. 19(A) is a display screen in accordance with the third embodiment of the present invention presenting a menu of items at a level of the data hierarchy lower than that of FIG. 18(B)

At a lower level is a landmark point list composed of minimum unit data groups j in number (j=n X k), each including point name data indicating the specific name of a landmark, e.g. "TORANOMON" in the case where the landmarks include intersections; point name rendering data indicating the Japanese rendering of the name of the landmark for listing and displaying the landmark name in the KANA syllabary (as shown in FIG. 19(A)), as will be described hereinafter; point E.L. & N.L. data used to indicate the location of the landmark; map display scale data indicating the reduction in scale of the map display of the vicinity of the landmark; and registered point No. data indicating a registration number for reading additional data providing more detailed information relating to the landmark.

Figure 6:
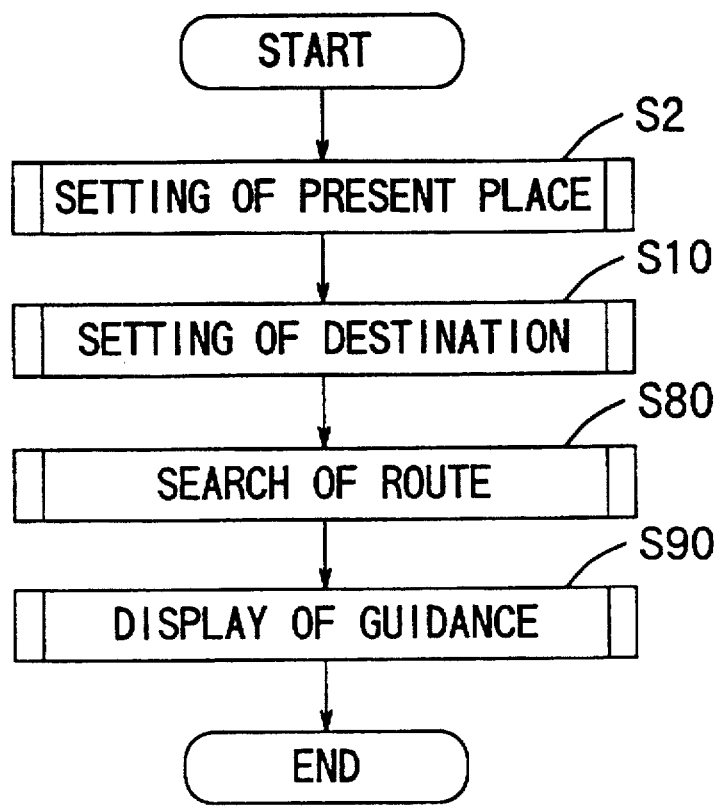
FIG. 6 is a flow chart of a control routine as utilized in the navigation system of FIG. 2.

The major steps executed by the control section 24 in processing the data stored in the aforementioned external storage unit 18 are summarily outlined in FIG. 6 and include a present position setting step S2, a destination setting step S10, a route searching step S80 and a guidance displaying step S90.

The present position setting step S2 includes clearing a reference place for guiding the travel of the vehicle by presetting the present position as the departure point of the vehicle before beginning travel and is started by turning on the power supply of the navigation system 10 responsive to the starting of the engine of the vehicle. In step S2, the initial screen displayed on the display screen 22a provides for setting the present position of the vehicle by operations similar to those of the later described destination setting step S10. When this step S2 is ended, a map for the vicinity of the set present position is displayed on the display screen 22a. Incidentally, this map for the vicinity of the present position can be read out from the backup RAM forming part of the RAM 30 and automatically displayed without input of any instruction, when the power supply of the navigation system 10 is turned ON again. This is because the most recently set present position is stored in the backup RAM.

The route searching step S80 executes a search for the optimum route between the present position or the departure point set at the step S2 and the destination set at step S10. Step S90 provides guidance for travel of the vehicle along the optimum route determined in step S80, by displaying a map, with the present position indicated thereon, on display screen 22a and further provides voice guidance from the voice output unit 20.

Figure 10:
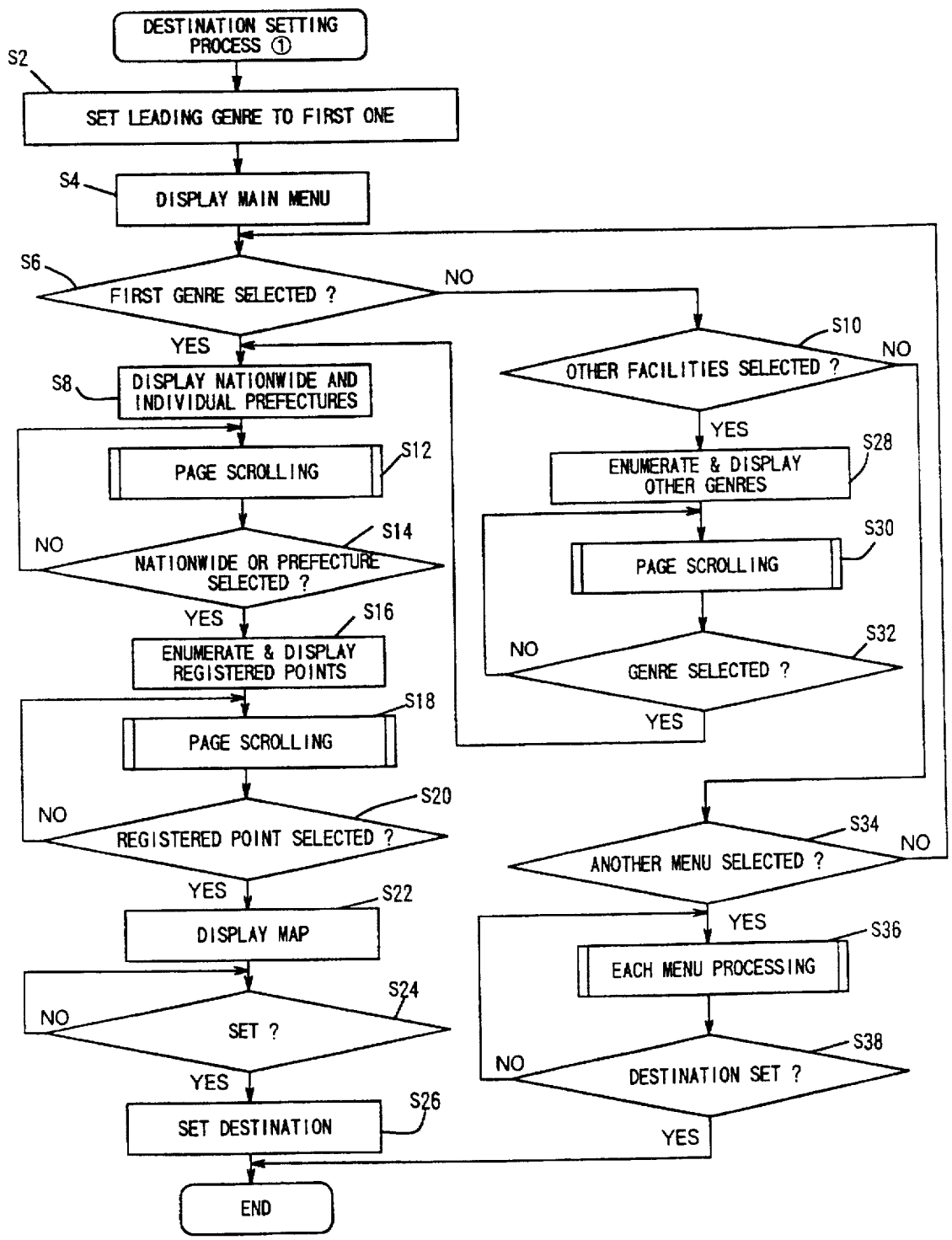
FIG. 10 is a flow chart for operating the first embodiment of the present invention and corresponds to step S10 of the routine illustrated in FIG. 6.
Figure 11:
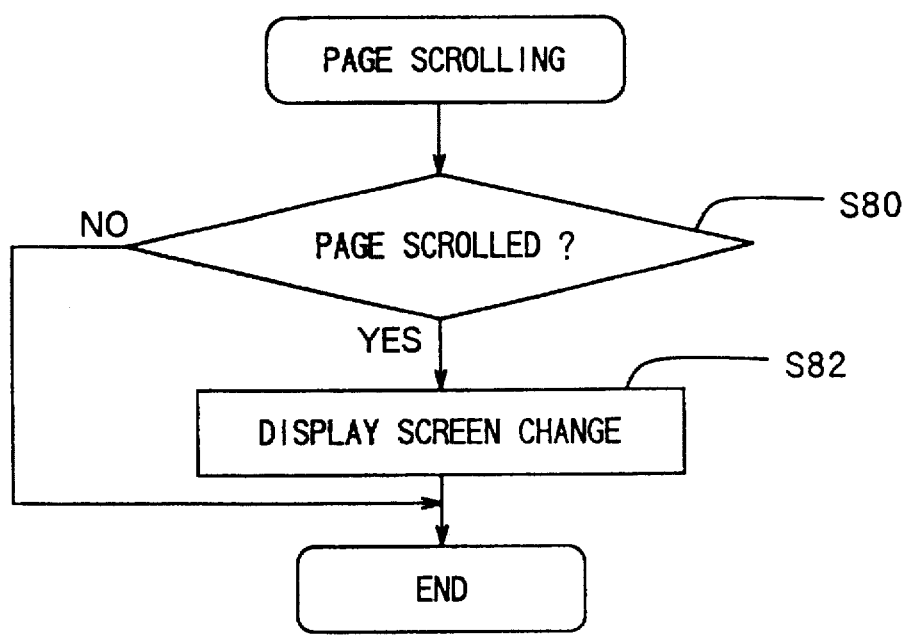
FIG. 11 is a flow chart of the subroutine for scrolling, for example, between the screens as illustrated in FIGS. 9(A), 9(B) and 9(C)

In a first embodiment of destination setting as shown in FIGS. 10 and 11, step ① is executed in the control section 24, responsive to operation of the destination setting switch 16b, by reading out the aforementioned registered point data or the like from the disc and by hierarchically displaying a main menu, as exemplified by FIG. 3(B), on the display screen 22a so that the operator is able to set the destination point easily.

Figure 8:
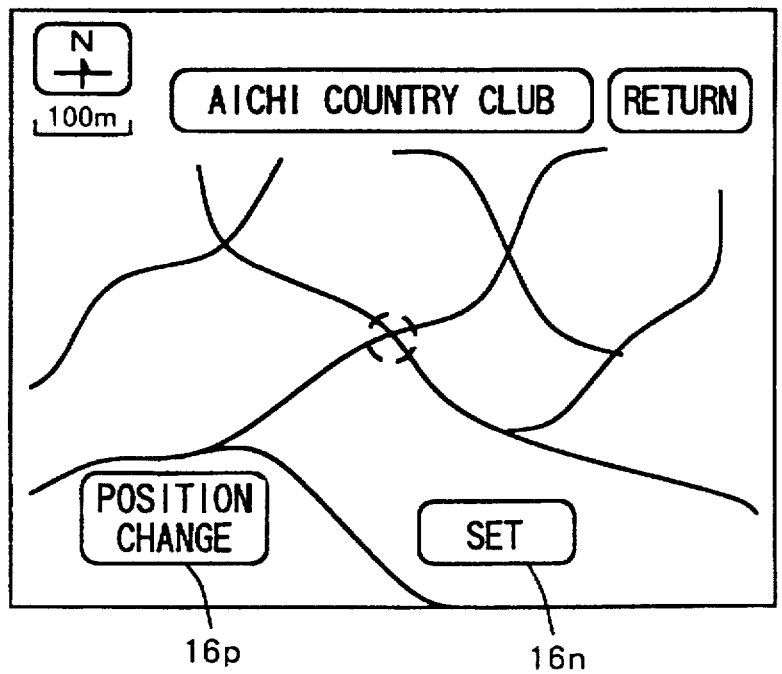
FIG. 8 is a schematic illustration of a fifth display screen of the present invention representing an item corresponding to the lowest hierarchial level of data.

In using the main menu, as exemplified in FIG. 3(B), when a first genre is selected e.g., by operation of the switch 16d "GOLF COURSE" displayed under the heading "Names of Facilities," a second level menu for selection of a nationwide, state or prefecture, as exemplified in FIG. 7(A), is instantly displayed. When one of the switches 16i is selected from the screen of the second level menu, a third level menu listing registered destination point names, within the selected genre and within the selected state or prefecture (or nationwide), is displayed. For example, the display of FIG. 7(B) would appear on the display screen 22a if "GOLF COURSES OF AICHI" was selected from the display of FIG. 7(A). When any of the registered points is selected from the third level menu, e.g. FIG. 7(B), a registered point is displayed, e.g. FIG. 8. FIG. 8(A) exemplifies such a vicinity map for the case in which the registered point "AICHI COUNTRY CLUB" is selected from the menu of FIG. 7(B).

Figure 9B:
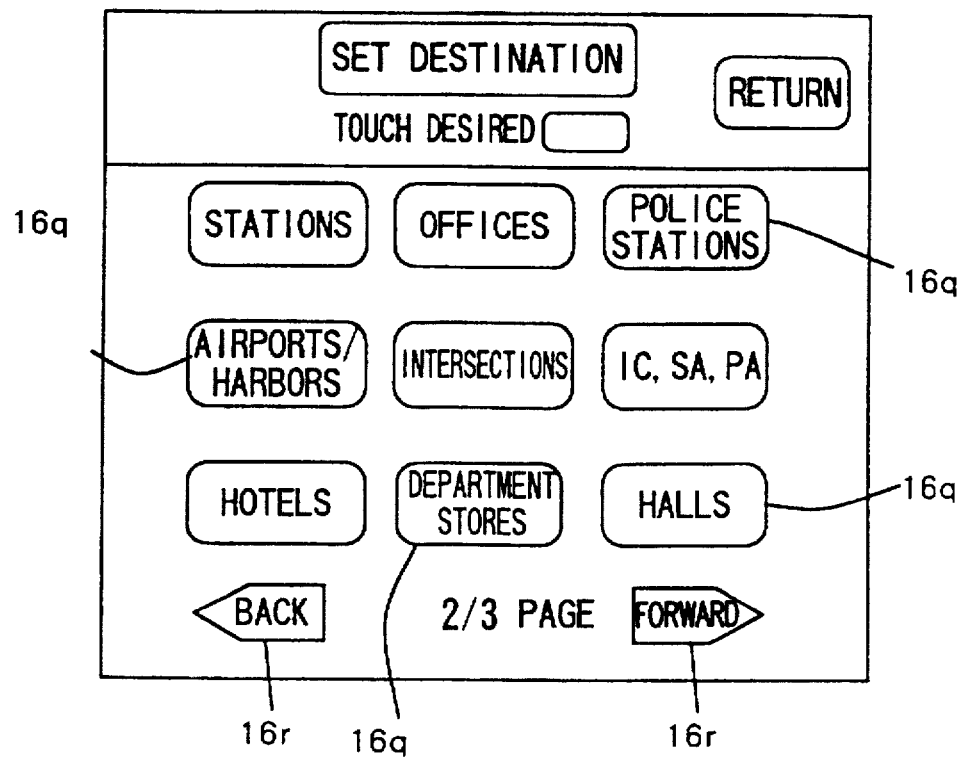
FIG. 9(B) is a schematic illustration of another version of the sixth display screen of the present invention, as illustrated in FIG. 9(A), obtainable by scrolling from FIG. 9(A)
Figure 9C:
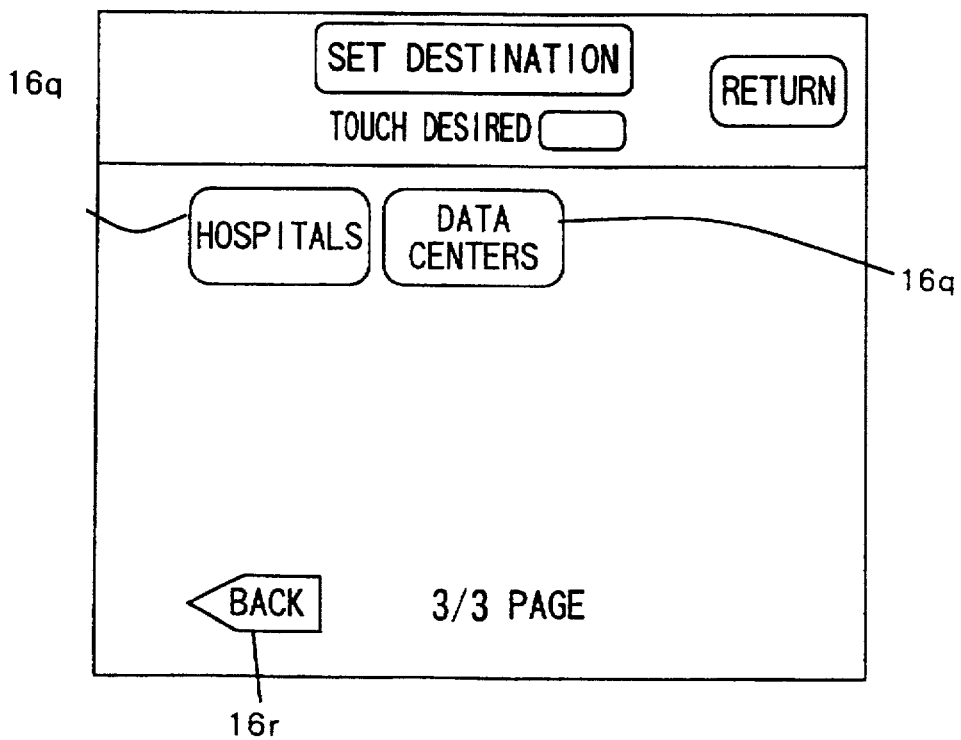
FIG. 9(C) is yet another version of the sixth display screen of the present invention, obtainable by further scrolling from FIG. 9(B)

On the other hand, when the item "Other Facilities" 16e (FIG. 3(B)) displayed in the area for "Names of Facilities"

in the main menu is selected, individual genres are displayed in a second level menu as exemplified in FIGS. 9(A), 9(B) and 9(C). As shown in FIGS. 9(A), 9(B) and 9(C) individual genre 16q including "AMUSEMENT PARKS", "SKIING AREAS", "STATIONS" and "TOWN OFFICES", belonging to the same hierarchy as the golf course genre 16d, are listed and displayed for selection (second level menu). When an individual genre 16q is selected, the nationwide and individual state or prefecture menus are listed and displayed for the selected genre 16q, as in case where the aforementioned first genre 16d is selected. After this, the selection process proceeds through lower level menus corresponding to 16d (or 16q).

A first embodiment of the destination setting step ① will now be described in detail in the following with reference to FIGS. 10 and 11. In step S2, the leading genre name data of the index data (as shown in FIG. 4) is read from the disc of the external storage unit 18 and is set as the first genre, and the routine advances to step S4. At step S4, the genre name data of the leading genre read out in step S2 and predetermined data stored in the disc of the external storage unit 18 are processed to drive and control the display section 22 so that the main menu containing the first genre menu 16d, listing the names of the first genre, as exemplified in FIG. 3(B), is displayed on the display screen 22a. Here, "Other Facilities" item 16e on the main menu represents a menu of a predetermined hierarchy, whereas the "Golf Course" item 16d corresponds to one of the plurality of menus of a lower hierarchy corresponding to the other facilities menu called up by operation of switch 16e. In execution of step S4, the control section 24 functions as a "fourth control means." Moreover, the first genre name data stored as the index data will be referred to herein as "the predetermined information."

After execution of step S4, the routine advances to step S6, wherein it is decided whether or not the first genre 16d has been selected from the main menu. If affirmed in step S6 that the first genre menu 16d has been selected, the routine advances to step S8. If a lower level menu other than the first genre menu 16d is selected, the routine advances directly from step S6 to step S10.

In step S8, data prestored in the disc of the external storage unit 18 is processed to drive and control the display section 22 so that a listing of the nationwide and state (or prefecture, province, county, etc.) menu names for the first genre is displayed on the display screen 22a, as exemplified in FIG. 7(A), and the routine advances to step S12. Here, the individual state or prefecture menu names are listed and displayed in the KANA syllabic order, with the nationwide menu at the top of the list, and selection keys 16i are displayed to the side of the respective names of the individual menus, for selection of a nationwide or state (or prefecture, etc.) menu corresponding to select key 16i which is operated. Page scroll keys 16j are also displayed at the left-hand side of the display screen 22a, as exemplified in FIG. 7(A). By operation of a scroll key 16j, the screen can be switched to list and display the names of additional individual prefecture menus, which were not displayed in the immediately preceding screen, in the KANA syllabic order.

In the page scrolling step S12, executed subsequent to step S8, as shown in FIG. 10, it is first decided at step S80 (see FIG. 11) whether or not the page scrolling key 16j has been operated. In the absence of this operation, the answer of step S80 is NO, page scrolling of step S12 is ended, and the routine advances to step S14. If, on the other hand, the page scrolling key 16j has been operated, the answer of step S80 is YES, and the routine advances to step 82, at which the display screen of the display 22a is switched in response to the operation of the page scrolling key 16j. After this, the page scrolling step S12 is ended, and the routine advances to step S14.

At step S14, whether or not a selection of any state or nationwide menu has been made by operation of one of the selection keys 16i is determined. If any state menu or the nationwide menu has been selected, the answer in step S14 is YES, and the routine advances to step S16. If, on the other hand, none of the selection keys 16i has been operated, so that no state or nationwide menu has been selected, the answer in step S14 is NO, and the routine returns to step S12, where page scrolling is again executed.

At step S16, of the data group set for the registered point data for the individual selected genre (state or nationwide) is read out from the disc of the external storage unit 18 on the basis of the point data address & size data of the first genre stored at the head of the index data listing, (as schematically shown by dotted lines in FIG. 4). As shown in FIG. 4, the data group set will include registered point name data and the registered point name rendering data of the data group, which are assigned the attribute data of the selected prefecture. The data thus read is processed to drive and control the display on display screen 22 so that the registered point names of the first genre, representing destinations located in the selected prefecture, are listed and displayed in KANA syllabic order on the display screen 22a, as exemplified in FIG. 7(B). Incidentally, in the case where the nationwide menu is selected, the division of data ("attribute data") by state (or prefecture, province, county, etc.) is ignored, and all the registered point name data and the registered point name rendering data for the selected data group set is read from the disc of the external storage unit 18, as described above, and processed to list and display the nationwide registered point names of the first genre, in the KANA syllabic order on the display screen 22a. By executing this step S16, as well as the foregoing steps S4 and S8 and later—described step S28, the control section 24 functions as a "second control means".

When a selection key 16k on the screen of FIG. 7(B) is operated, the corresponding registered point is selected. If a page scrolling key 16m is operated, the display screen can be switched to list and display the names of additional registered points. This capability is identical to the aforementioned case in which names of menus for the nationwide and individual states are listed and displayed, as exemplified in FIG. 7(A).

In the page scrolling step S18 (as shown in FIG. 10), as in the aforementioned step S12, it is decided (at Step 80) whether or not the page scrolling key 16k has been operated. If this key 16K has been operated, the display on the display screen 22a is switched (at S82), and the routine advances to step S20. If, on the other hand, the page scrolling key 16k has not been operated, the routine instantly advances to step S20.

At step S20, a decision is made whether or not any of the registered points has been selected by operation of one of the select keys 16k. If none of the registered points has been selected, the answer in step S20 is NO, and the routine returns to step S18 to execute the page scrolling step. If, on the other hand, a registered point is selected by operation of a select key 16k, the answer in step S20 is YES, and the routine advances to step S22.

At step S22, the point E.L. & N.L. data and the map display scale data for the selected registered point name are utilized to retrieve map data stored in the disc of the external storage unit 18. By driving and controlling the display section 22 on basis of the retrieved data, a map for the vicinity of the registered point is displayed on the display screen 22a, as exemplified in FIG. 8. By executing this step S22, the control section 24 functions as a "first control means". By additionally executing the aforementioned step S8 and step S16 and the later described step S28, moreover, the control section 24 functions as the "third control means".

If, on the other hand, the "set" key 16n displayed in the lower side of the screen shown in FIG. 8, is operated, the central position on the map being displayed at the time of operation of key 16n is set as the destination. On the other hand, if a position changing key 16p is operated, the central position of the map currently displayed can be changed.

At step S24 it is decided whether or not the set key 16n has been operated. Without this operation, processing is delayed until the set key 16n is operated. When the set key 16n is operated, the answer of step S24 is YES, and the routine advances to step S26. At step S26, the central position of the map being displayed at the time of operation is set, and the destination setting step ① is ended.

If, on the other than, it is decided in step S6 that the first genre 16d has not been selected from the main menu of FIG. 3(B), the routine advances to step S10, wherein it is decided whether or not the "other facilities" menu 16e has been selected.

If the "other facilities" switch 16e is operated, the answer of step S10 becomes "YES", and the routine advances to step S28. On the other hand, if the "other facilities" switch 16e has not been operated, the answer in step S10 becomes NO, and the routine advances to the later-described step S34.

At step S28, all the genre name data other than the leading genre name data of the index data, as shown in FIG. 4, are read out from the disc of the external storage unit 18 and are processed to drive and control the display section 22 so that a plurality of genre menus 16q, of the same hierarchy as that of the aforementioned first genre 16d, are listed and displayed on the display screen 22a, as exemplified in FIGS. 9(A)–9(C).

If page scrolling key 16r displayed in the lower corner of the screen of FIG. 9(A) is operated, the page displayed in the page scrolling key 16r would be switched so that the genre names 16q, which are not found in the screen before switching, can be displayed on the display screen 22a, as exemplified in FIGS. 9(B) and 9(C).

In the page scrolling step S30, as in the case of the aforementioned page scrolling step S12, it is decided at step S80 whether or not the page scrolling key 16r has been operated. If operated, the routine advances to step S82 wherein the screen is switched to that of the page which is displayed in the page scrolling key 16r when operated, so that another genre menu is displayed on the display screen 22a. After this, the routine advances to step S32. If, on the other hand, it is decided at step S80 that the page scrolling key 16r has not been operated, the step S30 is instantly ended, and the routine advances to step S32.

At step S32, it is determined whether or not any genre menu has been selected by touching a key 16q. If a genre menu selection key 16q has been touched (selected), the answer in step S32 is YES, and the routine advances to the aforementioned step S8. In step S8, the data prestored in the disc of the external storage unit 18 is read to drive and control the display section 22 so that the names of the nationwide and individual prefecture menus for the selected genre are listed and displayed on the display screen 22a as in the aforementioned case exemplified in FIG. 7(A). After this, the steps S8+ are executed as in the case in which the aforementioned first genre menu 16d is selected. If, on the other hand, it is decided at step S32 that none of the genre menus 16q has been selected, the routine returns to step S30, where the page scrolling step is again executed.

If it is decided at the aforementioned step S10 that the "other facilities" menu 16e has not been selected, the routine advances to step S34, where it is decided whether or not a main menu, such as the telephone number menu 16f, the address menu 16g or the home menu 16h, other than the first genre menu 16d and the "other facilities" menu 16e, has been selected from the screen of the main menu, as exemplified in FIG. 3(B). If any of these other menus has been selected, the answer of step S34 is denied, and the routine returns to step S6, where the aforementioned step is again executed. If, on the other hand, it is decided at step S34 that another menu has been selected, the answer of step S34 is YES, and the routine advances to step S36, wherein the individual menu steps are executed according to the selected menu. After this, the routine advances to step S38, at which it is decided whether or not the destination is set. If the destination is set as a result of the execution of the individual menu steps of step S36, the answer of step S38 is YES, and the destination setting step ① is ended.

When the telephone number menu 16f is selected, for example, the operation of setting the destination is executed by inputting the telephone number of the destination. If the address menu 16g is selected, on the other hand, the operation for setting the destination is executed by inputting the address of the destination.

In the destination setting step ① thus far described, the first genre menu switch 16d, of the same hierarchy as that of the genre menu items 16q of the lower hierarchy listed and displayed responsive to selection of the "other facilities" menu 16e, is displayed as well as the other facilities menu switch 16e (at S4, as exemplified in FIG. 3(B)) in the main menu displayed on the display screen 22a of FIG. 3(B). If the first genre menu 16d is selected (if YES at S6), the nationwide and individual state menus are instantly listed and displayed at S8, as exemplified in FIG. 7(A).

The case in which the first genre menu 16d is selected will now be compared with the case in which a genre menu 16q is selected. In the latter case, the nationwide and individual state menus are not listed and displayed (at S8) until one genre menu 16q is first selected from among the plurality of genre menus 16q which are displayed responsive to selection of the "other facilities" menu 16e (if YES at S10). Thus, the former has a higher operation efficiency because it involves one less step in the process of destination selection than does the latter.

In the first embodiment, therefore, the genre name data for displaying the genre menu to be most frequently used by the operator are stored as the first genre name data entry in the index data on the disc of the external storage unit 18, so that the genre menu most frequently s elected is displayed as the first genre menu 16d in the main menu. As a result, the destination can be more efficiently set.

To determine the genre menu most frequently used by the operator, for each kind of the vehicle, the tastes of the driver or passenger envisioned as using the vehicle may be estimated so that they may be taken into consideration. For example, if the navigation system 10 is to be mounted in an all terrain type vehicle, genre name data for displaying the genre menu "CAMPSITES" is prestored as the first entry in the index data of the disc of the external storage unit 18 of the navigation system 10 so that the genre "CAMPSITES" may be displayed as the first genre menu 16d.

A second embodiment of the present invention will be described in the following, with emphasis on the differences from the foregoing first embodiment. In the second embodiment, with the same construction as that of the first embodiment with respect to FIGS. 2, 3(A) and 4, the control section 24 executes a destination setting step ②, as shown in the flow charts of FIGS. 12 and 13. In describing the destination setting processing with reference to the flow charts of FIGS. 12 and 13, the steps which are the same as those of the first embodiment, as described with reference to FIGS. 8 and 9, will not be again described but will be identified by adding 200 to the reference numerals corresponding to the steps of the first embodiment.

In the destination setting step ② of the second embodiment, the first genre menu selection switch 16d, displayed in the main menu on the display screen 22a, is set to the genre menu 16q selected in the immediately preceding destination setting step ② stored in the backup RAM in the RAM 30. As a result, what is displayed as the first genre menu 16d in the main menu in the second embodiment is the genre menu 16q which has previously been selected in the destination setting step ② executed in the most recent operation.

Figure 12:
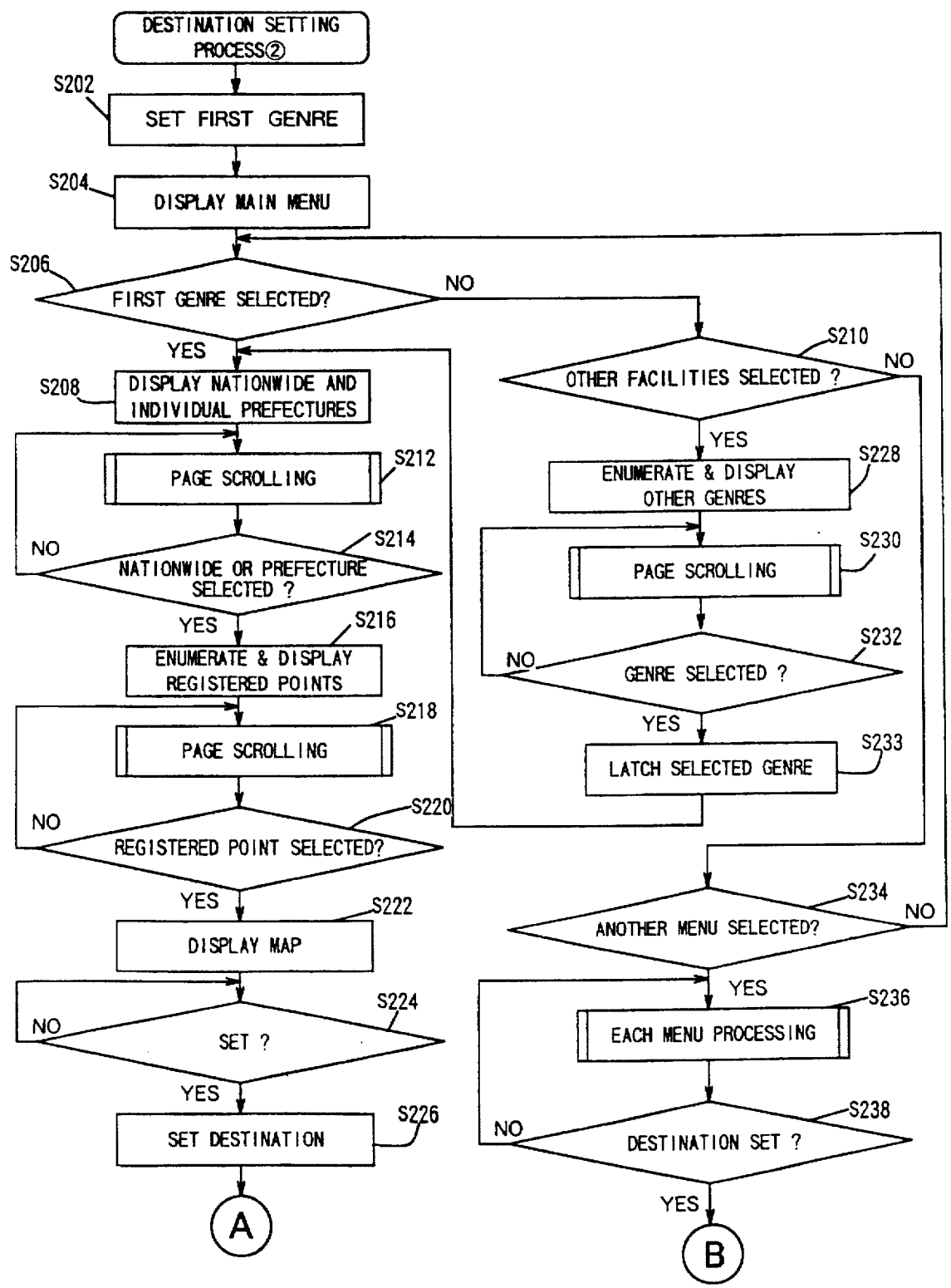
FIGS. 12 and 13 are flow charts which together illustrate a routine for operating the second embodiment of the system of the present invention and, together, correspond to step S10 of FIG. 6.

The destination setting step ② of the second embodiment will be described in detail with reference to FIGS. 12 and 13. When the destination setting step ② is started, in the first step S202, the first genre menu 6d is set on the basis of the genre name data stored in the backup RAM in the RAM 30. In step S202, before the first genre menu 16d is set, it is determined whether not the genre name data stored in the backup RAM is stored in the index data in the disc of the external storage unit 18. If stored, the first genre menu 16d is set on the basis of the genre name data stored in the backup RAM, as described above. In an exceptional case, however, if the genre name data stored in the backup RAM is not stored in the index data, the first genre menu 16d is set to the genre name data stored in the first position within the index data. Such an extremely exceptional case may occur when, for example, the genre name data stored as index data is different as between discs for old and new year editions. Under such circumstances, in the destination setting step ② executed immediately after the disc is changed from the year old to the new year editions, the genre name data in the backup RAM written on the basis of the index data of the disc of the old year edition may not find a match in the index data of the disc of the new edition. However, this is an exceptional case and has little relation to a description of the present invention.

In step S204 the genre name data stored in the backup RAM and the predetermined data stored in the disc of the external storage unit 18 are processed to drive and control the display section 22 so that the main menu containing the first genre menu 16d set at step S202 is displayed in the display 22a, as exemplified in FIG. 3(B).

The steps S206 to S226 executed subsequent to step S204 are similar to steps S6 to S26 of the previously described first embodiment. Moreover, the steps S210 and S228 to S232, which are executed if it is decided at step S206 that the first genre menu 16d is not selected, are substantially similar to steps S10 and S28 to S32 of the foregoing first embodiment.

In the second embodiment, however, the routine does not advance directly to step S208 to enumerate and display the nationwide and individual state or prefecture menus of the selected genre immediately after a positive answer in step S232, as in the first embodiment, that is, after one of the genre menus 16q is selected from the screen of the display 22a, as exemplified in FIGS. 9(A), 9(B) and 9(C). In the second embodiment, on the contrary, the step S233 is first executed to write and latch the genre name data for displaying the selected genre menu 16q in a predetermined region of the RAM 30, and the routine then advances to step S208, in which the nationwide and individual state or prefecture menus are listed and displayed for the selected genre.

Figure 13:
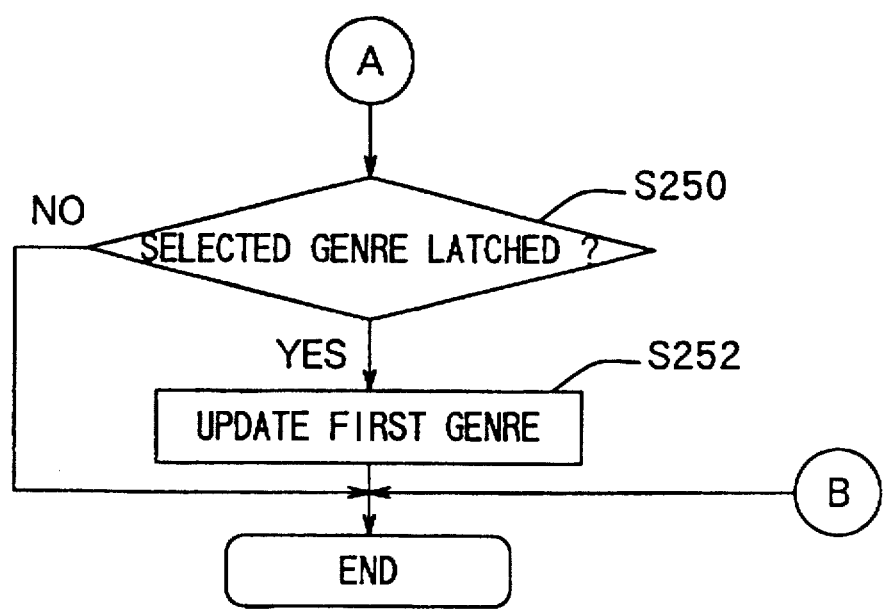

After the destination is set by executing the steps S208 to S226, the routine advances to step S250 shown in FIG. 13, in which it is determined whether or not the genre name data are latched in the predetermined region of the RAM 30 by execution of the preceding step S233. If the genre name data are latched in the RAM 30, the answer of step S250 is YES, and the routine advances to step S252, in which the genre name data for setting the first genre menu 16d in step S202, for use in the next destination setting step ②, are updated by writing the genre name data in the backup RAM. After this, the destination setting step ② is ended. By executing this step S252 as well as the aforementioned step S233, the control section 24 functions as a "learning means."

If, on the other hand, none of the genre name data is latched in the predetermined region of the RAM 30, the answer of step S250 is NO, and the routine skips the step S252 to instantly end the destination setting step ②.

In the destination setting step ②, therefore, if the first genre menu 16d is selected (if YES in S206) in the main menu, the genre name data in the backup RAM is not updated (if NO at S250). As a result, the first genre menu 16d will be the same used as the first genre menu 16d in the next destination setting step ②and is displayed together with the main menu on the display screen 22a.

On the other hand, when the other facilities menu 6e is selected (if NO at S206 and if YES at S210) from the main menu, so that any of the genre menus 16q, shown in FIGS. 9(A), 9(B) and 9(C) may be selected (if YES at S232), the genre name data for displaying the selected genre menu 16q are written and latched (at S233) in a predetermined region of the RAM 30. Before the end of the destination setting step ②, the genre name data in the backup RAM are updated (if YES at S250, and at S252) on the basis of the genre name data latched in the RAM 30. In the subsequent destination setting step ②, the genre menu 16q last selected is used as the first genre menu and is displayed together with the main menu on the display screen 22a.

In the second embodiment, therefore, the last selected genre menu in the previous destination setting process is used as the first genre menu and is displayed together with the main menu on the display screen 22a. As a result, if case the genre menu selected at the time of setting the previous destination is to be selected again, the first genre menu may be efficiently selected. As has been described in connection with the first embodiment, therefore, the "other facilities" menu 16e need not be selected in order to display a listing of the genre menus 16q.

As can be appreciated from FIGS. 9(A), 9(B) and 9(C), on the other hand, not all of the genre menus 16q can be displayed on one screen of the display 22a, and the page scrolling key 16r may have to be operated many times in order to select the desired one menu from among all the genre menus 16q. If, in this case, the desired genre menu is used as the first genre menu 16d in the navigation system 10 of the first embodiment or the second embodiment, such operation of the page scrolling key 16r becomes unnecessary, so that the operation efficiency can be improved. Thus, the first and second embodiments are especially effective in the case where a plurality of screens are necessary to display all the genre menus 16q on a small display screen 22a of the vehicular navigation system 10 to be mounted in a space-limited compartment.

As previously described in connection with the second embodiment, the genre menu, last selected in the previous destination selection process, is used as the first genre menu. Alternatively, there may be provided counter means for counting the number of selections of each of the genre menus, so that the genre menu most often selected may be displayed as the first genre menu in the main menu to further enhance operation efficiency.

In the first and second embodiments, the "other facilities" menu 16e, a menu of a predetermined hierarchy, together with one of the genre menus, a menu of a subsequent hierarchy, are displayed as a main menu, e.g. FIG. 3(B). However, the menu to be displayed together with the "other facilities" menu 16e is not limited to a menu of the hierarchy subsequent to that of the menu of the predetermined hierarchy. For example, together with the "other facilities" menu 16e, a menu two ranks lower in the hierarchy, such as the menu for "GOLF COURSES OF AICHI" or "AICHI COUNTRY CLUB" can be displayed in the main menu to further improve the efficiency of the menu selecting operation. In this case, the gap between the predetermined hierarchy for "other facilities" and the lower hierarchy menu displayed therewith is enlarged to increase the number of hierarchies therebetween the two hierarchies and to increase the number of the menu selecting operations to be omitted.

While the first and second embodiments have been described as providing for display of a single menu of a lower hierarchy together with the "other facilities" menu 16e (a menu of predetermined hierarchy), the first genre menu is not limited to the one menu 16d; rather, the efficiency of the menu selecting operation can be further improved by providing a second genre menu and a third genre menu, for example, and by displaying those second and/or third genre menus as well as the first genre menu together with the menu of the predetermined hierarchy in the main menu. If, for example, three or so of the menus of the lower hierarchy are identified and retrieved, based on frequency of past selections, and are displayed together with the menu of highest level in the hierarchy, there can be achieved remarkably high convenience and operational efficiency.

As noted above, the destination setting step S10 is started by operating the destination setting switch 16b, shown in FIG. 3(A), which operation switches the display to that shown in FIG. 3(B). The display screen shown in FIG. 3(B) allows the home or previous departure place already registered to be set as the destination by touching one of the touch switches indicated by rectangles. In addition to switches for selecting "golf course" or "other facilities" as the destination, a desired destination can be set by input of an address or telephone number. The storage medium such as the CD ROM, which is stored in advance with all the nationwide addresses and telephone numbers, is extremely difficult to manufacture, because the addresses and the telephone numbers will change with lapse of time. Specifically, the address names may change as a result of changes in administrative jurisdiction, and a new address may be assigned as a result of housing construction, change of street name, etc. On the other hand, telephone numbers may be frequently renewed or abolished even within a time frame of one year for which the telephone directory or the standard materials, which serve as sources for the stored data, are issued. Thus, when the destination or the present place is to be set, the input address or telephone number may not find a match in the storage medium. In this case, it would be convenient to give a clue (in the form of a "landmark") to enable the operator to reach the desired location.

A plurality of telephone numbers can be assigned to one location as in the case of an apartment building or a building housing a number of independent businesses, so that the number of telephone numbers is far larger than the number of addresses for that location. Since, moreover, there are unlisted telephone numbers which are not available to the general public, it is far more difficult to store all the telephone numbers on a storage medium than to store all the addresses.

Thus, the navigation system 10 of the present embodiment represents a larger savings in efficiency in the case where the destination is set by inputting a telephone number, than in the case where the destination is set by inputting an address.

The destination setting step by input of a telephone number is initiated by touching telephone number key 16d which is identified by the letters "TEL. NO." and enclosed by a rectangle, as shown in FIG. 3(B). The destination setting process thus initiated is illustrated in FIGS. 14 and 15.

Figure 14:
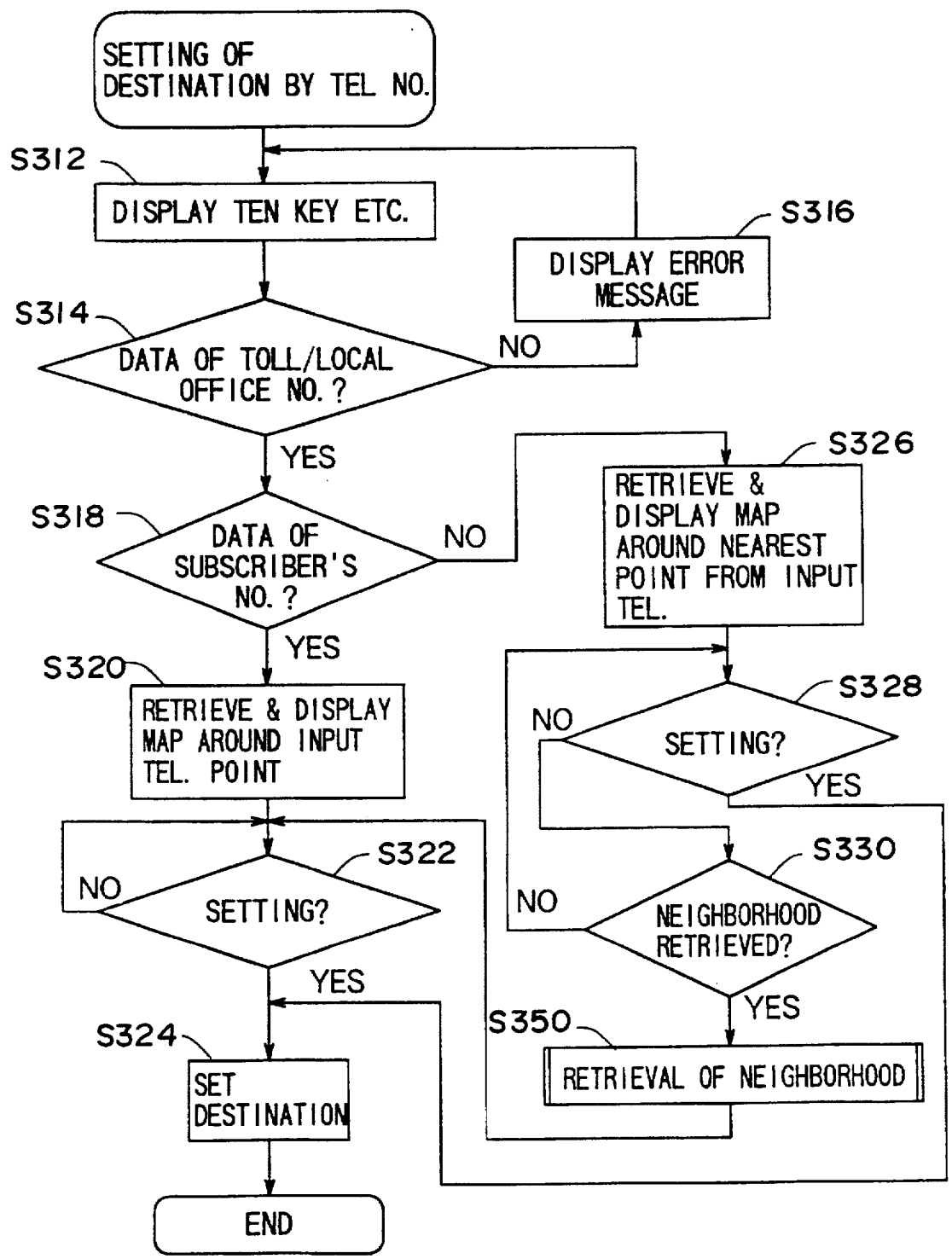
FIGS. 14 and 15 are flow charts which illustrate a routine for operating the system of the third embodiment of the present invention and correspond to step S10 of FIG. 6.
Figure 15:
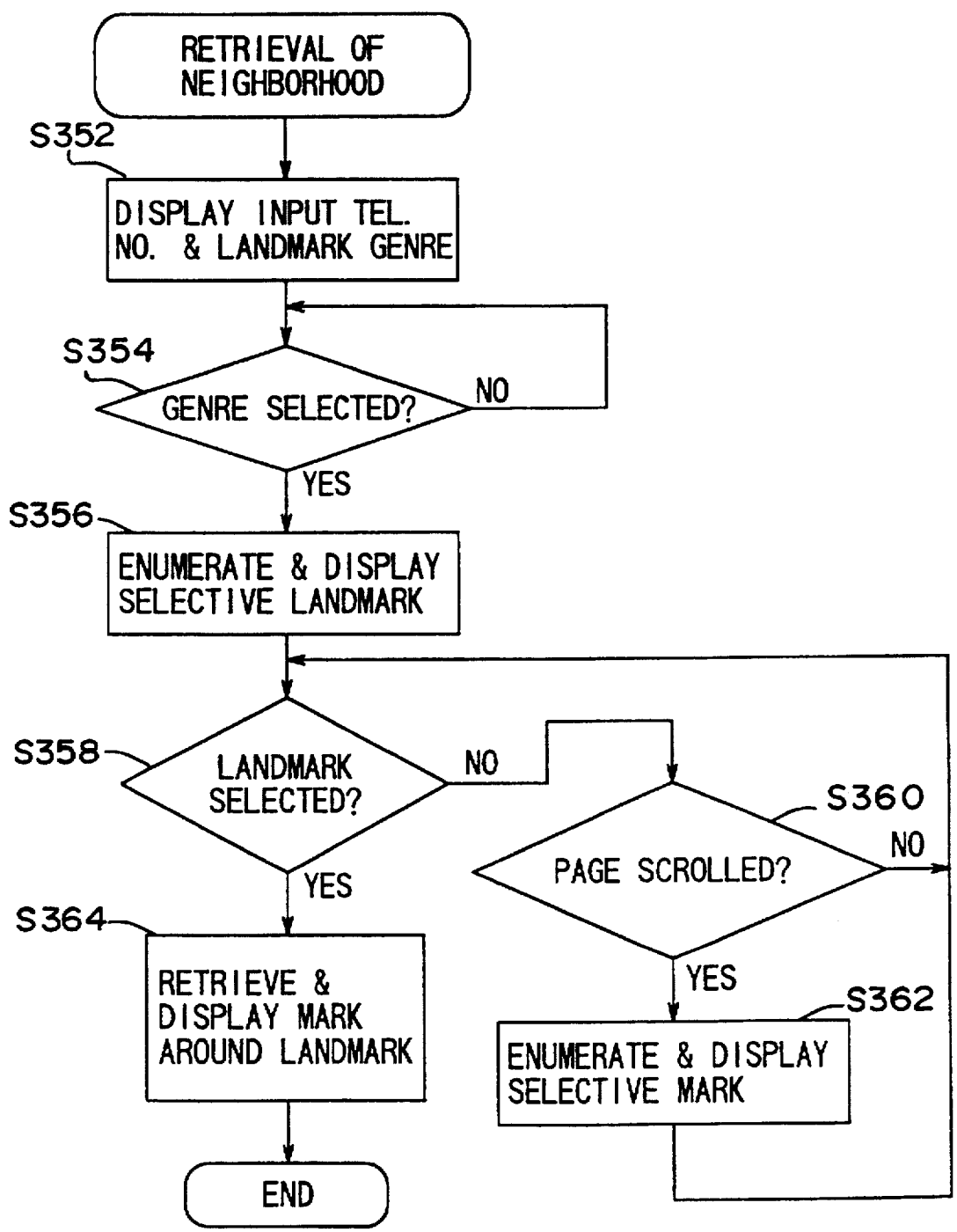

As illustrated in FIG. 14, it is decided at steps S312, S314 and S318 whether or not the data input as the position related information from a ten-key display (FIG. 16) in the form of a telephone number, is stored in the external storage unit 18. If the input telephone number is stored as data, the routine advances to steps S320 to S324, at which the neighborhood of the location to which the input telephone is assigned is set as the destination. If, on the contrary, the input telephone number is not found in the prestored data in the external memory unit 18, the routine advances through steps S326 to S350. As a result, the neighborhood searching step for selecting and displaying a landmark is executed to set the neighborhood of the landmark selected by the operator as the destination.

Figure 16A:
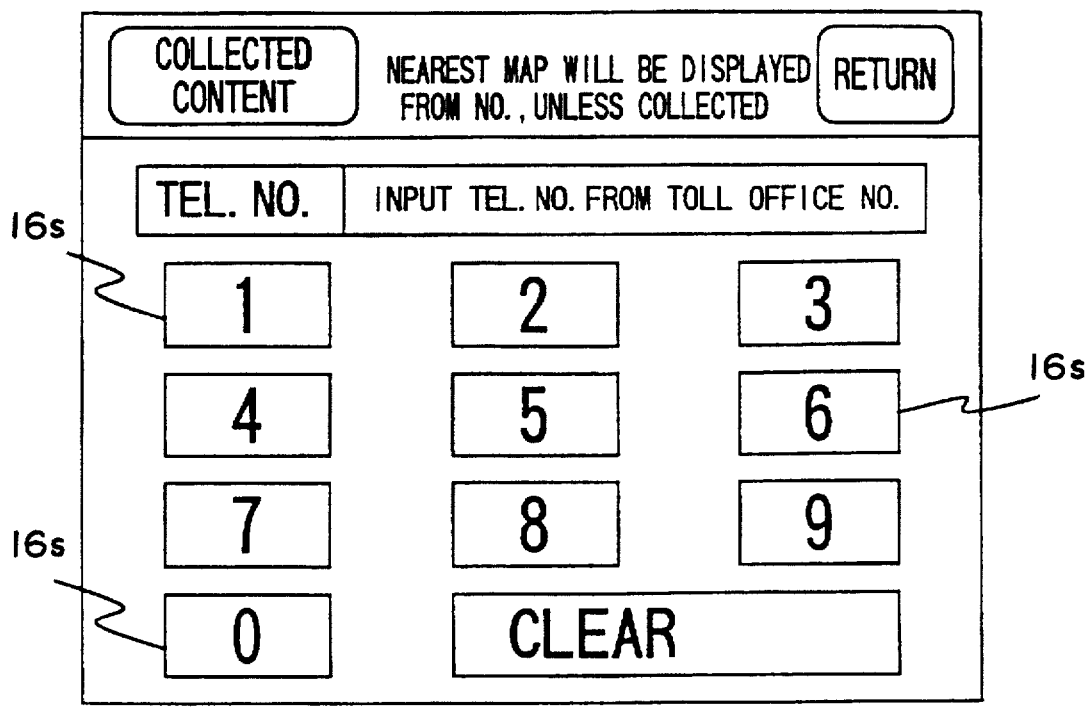
FIG. 16(A) illustrates the input stream used in connection with operation of the system of the third embodiment of the present invention.

In the first step S312, the display screen 22a is switched to the ten-key display of FIG. 16(A) with keys 16e, for use as input means, and the message "INPUT TEL. NO. FROM TOLL NO.", also appears on the display screen. Upon input of a telephone number the routine advances to step S314, where it is decided whether or not the input area code/local exchange number is in the area code/local exchange number list read out from the external memory unit 18. Unless there is a match between the prestored data and the input area code/local exchange number, the decision in step S314 is NO, and the routine advances to step S316, at which the error message "INPUT TEL. NO. WAS NOT COLLECTED" is displayed on the display screen 22a, until the routine is returned to step S312.

If, on the contrary, the input area code/local exchange number is in the prestored number list, the decision in S314 is YES and the routine advances to step S318. At step S318, it is decided whether or not the subscriber's number, i.e. the numeral series subsequent to the area code and/or local exchange, exists in the subscriber's number data in the data group set of the subscriber's number list which is read out from the external memory unit 18 on the basis of the subscriber's number address & size data in the same group data as the matched area code and/or local exchange.

Figure 16B:
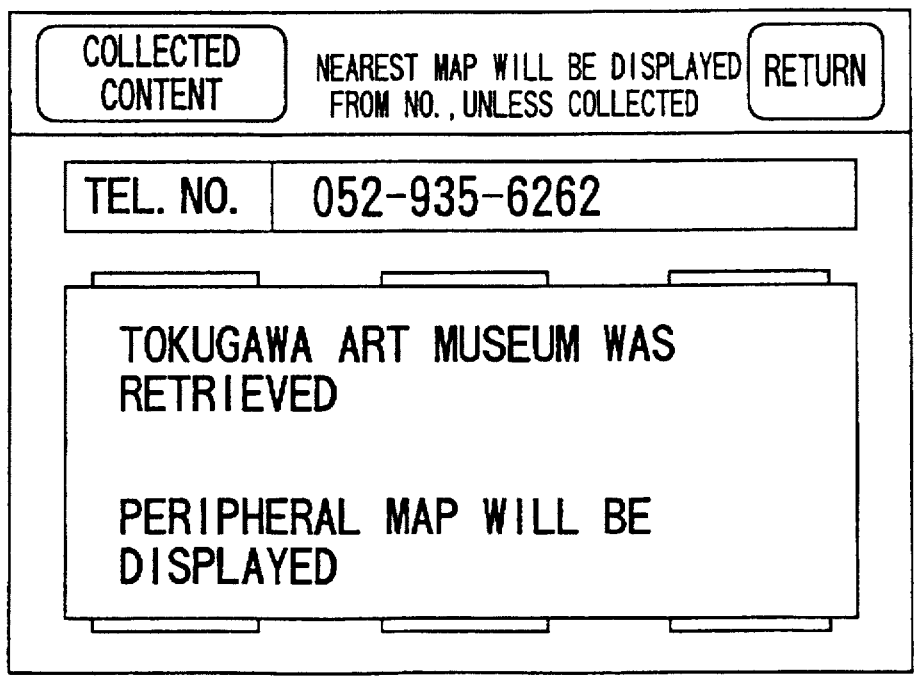
FIG. 16(B) illustrates a screen providing guidance information in accordance with the third embodiment of the present invention.
Figure 17A:
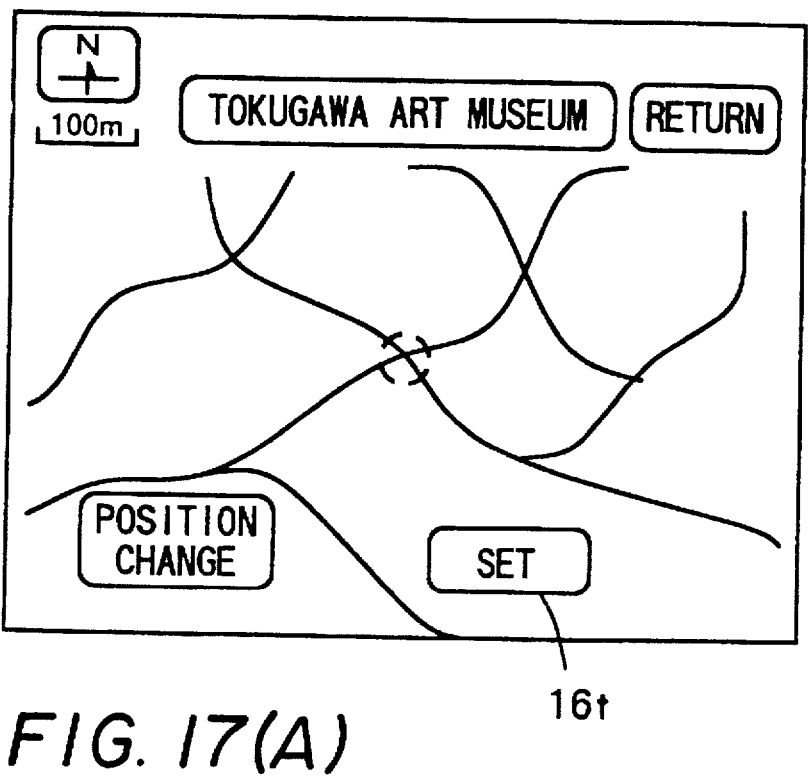
FIG. 17(A) illustrates a screen providing guidance information in accordance with the third embodiment of the present invention.

If there is a match with a prestored subscriber's number, the decision in step S318 is YES and the routine advances to step S320. At step S320, on the basis of the name data in the same data group as that of the matched subscriber's number found in step S18, the display section 22 is driven and controlled to display the subscriber's name corresponding to the input telephone number as shown in FIG. 16(B). After this, on the basis of the point E.L. & N.L. data and the map display scale data in the same data group as that of the subscriber's number, the map data stored in the external storage unit 18 is retrieved and processed for display on the basis of the map data thus read out and the display screen 22 as a map for the vicinity of the location or address of the input telephone number, together with a legend identifying the owner of the telephone number, as shown in FIG. 17(A).

For example, the telephone number "0529356262" is input through the ten-key 16e screen shown in FIG. 16(A). Then, the first six figures "052935" indicating the area code/local exchange are located in the area code/local exchange list (i.e., YES at S314). Then, the subscriber's number indicating the inputted subscriber's number "6262" is located (i.e., YES at S316) in the data group set of the subscriber's number list which is read out, on the basis of the subscriber's number address & size data, of the data group for the area code/local exchange number data indicating "052935". On the basis of the point E.L. & N.L. data and the map display scale data in the same data group as that of the searched and located subscriber's number data, map data stored in the external storage unit 18 is retrieved. On the basis of the name data in the same data group as that of the retrieved map data and the aforementioned subscriber's number data, the name "TOKUGAWA ART MUSEUM", i.e., the owner of the input telephone number, and the map for the vicinity around the location of same are displayed on the display screen 22a (step S320).

Subsequent to step S320, the routine advances to step S322. At step S322, it is decided whether or not the center portion of the map being displayed as the destination has been set by touching a set key 16t which has the letters "SET" enclosed by a rectangle at the right-hand lower portion of the display screen 22a, as shown in FIG. 17(A).

If set key 16t has not been operated, the determination is NO in step S322, and the setting operation is awaited. On the contrary, if the decision is YES in step S322, and the routine advances to step S324, at which the center position of the map displayed in the display 22a at the time of setting is set as the destination. This ends the destination setting step of this third embodiment, and the routine subsequently advances to step S80 of FIG. 6 wherein the aforementioned route searching is executed.

When it is decided at step S318 that data for the input subscriber's number is not present in the data group set of the subscribers' number list read out from the external storage unit 18, the decision is NO in step S318, and the routine advances to step S326. When this decision is NO in step S318, the control section 24 functions as a detect means.

Figure 17B:
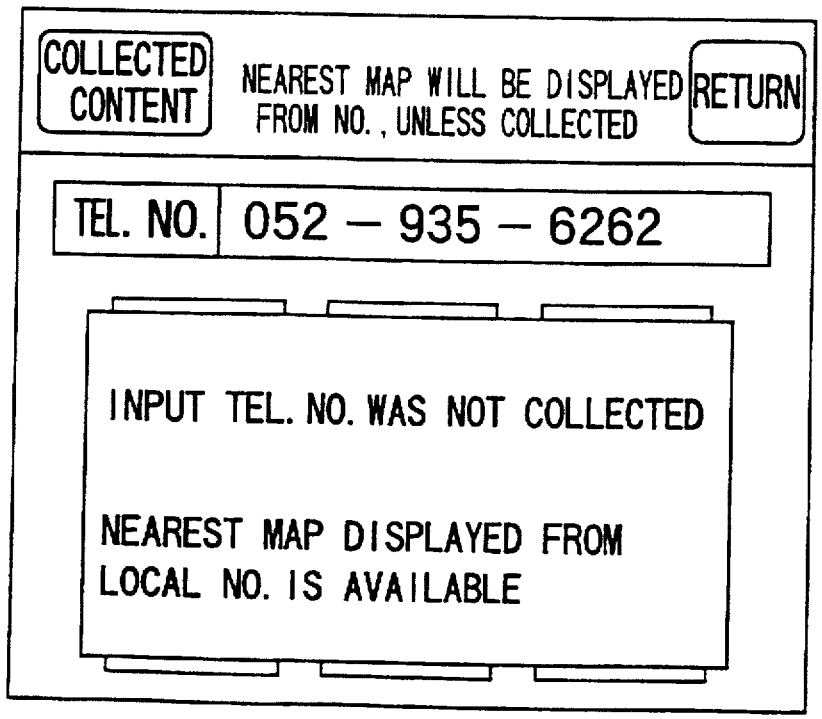
FIG. 17(B) is a guidance information output stream in accordance with the third embodiment of the present invention which may be displayed as an alternative to the display screen of FIG. 16(B)

At step S326, as shown in FIG. 17(B), the input telephone number, a message reporting its failure to be found in the prestored data, and the message "NEAREST MAP WILL BE DISPLAYED" are displayed. After this, on the basis of the representative point E.L. & N.L. data and the map display scale data in the same data group as that of the area code/local exchange number data indicating the office number already inputted, the map data stored in the external storage unit 18 is retrieved to read out the predetermined map data. On the basis of the map data read out, the display section 22 is driven and controlled so that the name of the area, to which the input local exchange is assigned, the input office number, and the representative point predetermined for that area are displayed on the display screen 22a, as shown in FIG. 18(A), and the routine then advances to step S328.

Figure 18A:
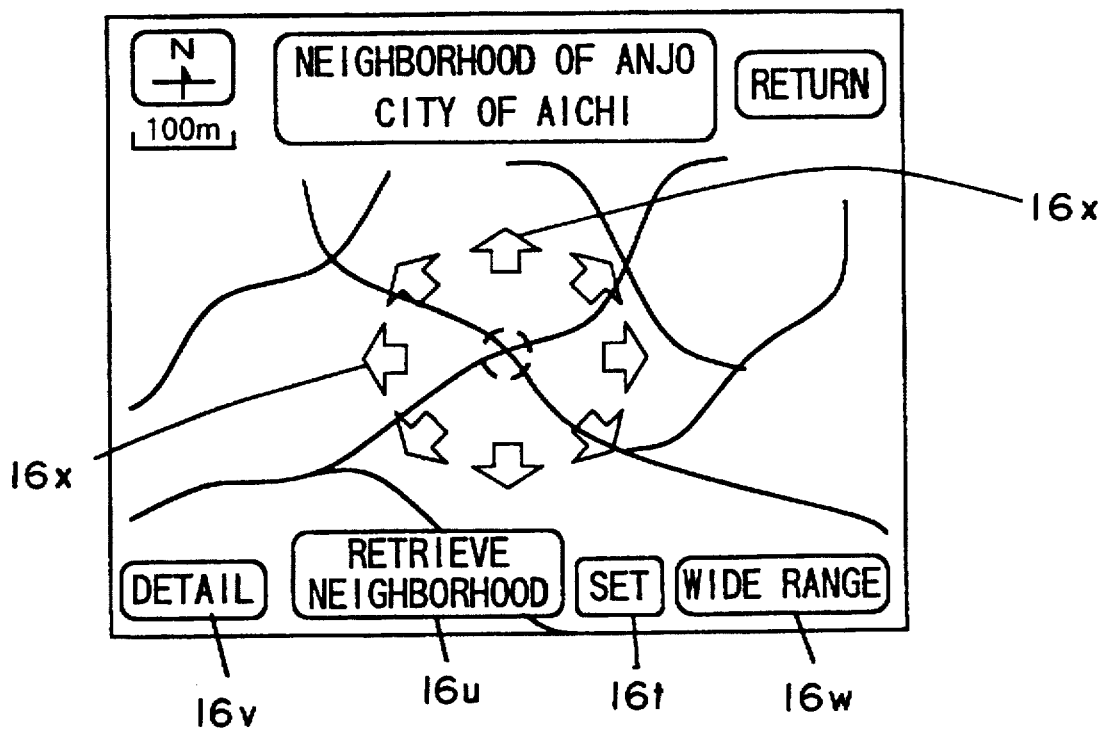
FIG. 18(A) is a display screen providing a menu at one hierarchal level in accordance with the third embodiment of the present invention.

In step S328, it is decided whether or not the center position of the map being displayed in the display 22a has been set as the destination by touching the set key 16t which is displayed at the right-hand lower but central portion of the display screen 22a, as shown in FIG. 18(A).

If this setting operation has been executed, the decision is YES in step S328, and the routine advances to step S324, in which the center position of the map displayed on the display screen 22a at the time of setting is set as the destination. After this, the destination setting step is ended, and the routine subsequently advances to step S80 in FIG. 6, wherein the aforementioned route searching step is executed.

On the other hand, if the setting operation is not executed through the screen shown in FIG. 18(A), the decision is NO in step S328, and the routine advances to step S330, at which it is decided whether or not a neighborhood retrieval key 16u displayed in the left-hand lower and central portion of the display screen 22a has been touched.

If the neighborhood retrieval key 16u has not been touched, the decision is NO in step S330, and the routine is returned to step S328. If, on the contrary, the neighborhood retrieval key 16u has been touched the decision is YES in step S330, and the routine advances to step S350, at which the neighborhood retrieval process shown in FIG. 15 is executed.

If the detail key 16v or the wide range key 16w displayed in the left-hand corner of the screen shown in FIG. 18(A) is touched, the map being displayed has its scale enlarged or reduced and thereby changed into either a detailed map or a wide range map. If, on the other hand, one of the scroll keys 16x, displayed as arrows radially from the center of the map, is touched, the map is scrolled in the direction of the selected arrow.

Figure 18B:
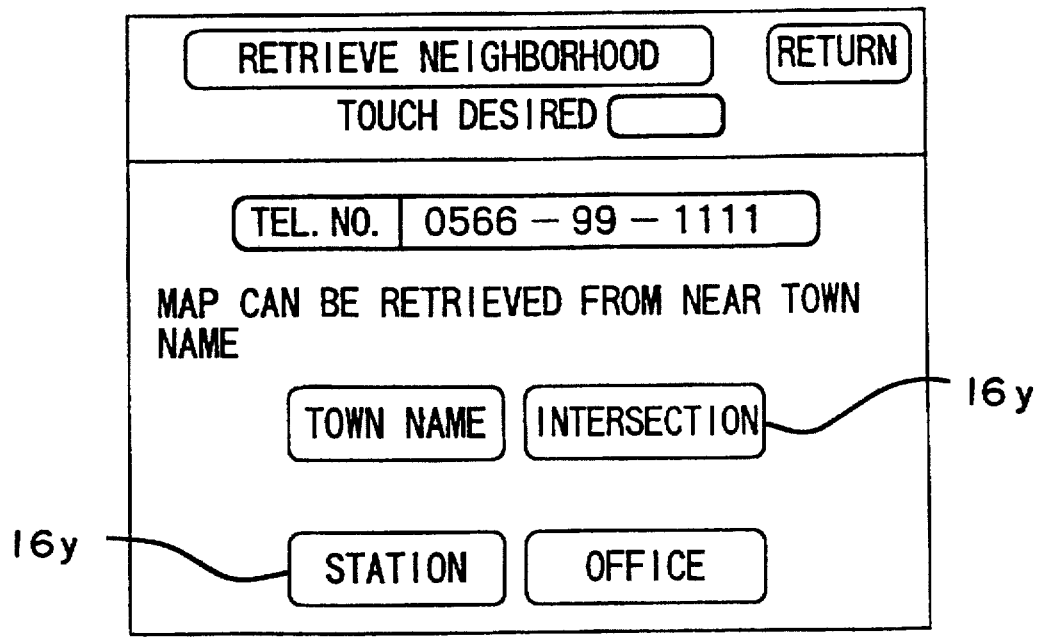
FIG. 18(B) is a display screen presenting a menu at a hierarchal level lower than the menu of the display screen of FIG. 18(A)

When the neighborhood retrieval processing of FIG. 15 is executed, in step S352, all the genre name data in the data group set for the landmark genre list read out from the external memory unit 18 on the basis of the landmark genre address & size data in the same data group as that of the area code/local exchange data indicating the inputted office number, and the thus read data is processed to generate the display screen shown in FIG. 18(B) which presents genre keys 16y, corresponding to landmarks located in the area preassigned to the input telephone number. The landmarks are classified by genre and keys 16y have the genre names enclosed by rectangles, which are displayed together with the input telephone number as shown in FIG. 18(B).

Subsequent to step S352, the routine advances to step S354, wherein it is decided whether or not a genre has been selected by touching one of the genre keys 16y. If none of the genre keys 16y is touched, the decision is NO in step S354, and operation of one of the genre keys 16k is awaited. If, on the contrary, one of the genre keys 16y is touched, it is decided that the genre indicated by the touched genre key 16k is selected, and the routine advances to step S356.

At step S356, on the basis of the landmark point address & size data for the data group containing data for genre name selected from the landmark genre list, a data group set is read out from the external storage unit 18. The point name data and the point name rendering data in the read data group set is processed to generate the screen display shown in FIG. 19(A) wherein are displayed, not only the selected genre names, but also all the names of the landmarks existing in the area assigned to the input telephone number. These displayed names identify the selected genre listed and displayed in KANA syllabic order, as shown in FIG. 19(A). By executing step S356, the control section 24 functions as both the "first control means" and as the "second control means" of the present invention.

Incidentally, where all the landmark names to be thus listed and displayed cannot be shown on a single screen, a scroll key 16z, is displayed at the left-hand side of the display screen of FIG. 19(A) for switching the display screen, as will be described below with reference to steps S360 and S362, so that the names of landmarks which were not displayed on the screen before switching can be sequentially listed and displayed in KANA syllabic order.

At step S358 it is decided whether or not a landmark has been selected by touching one of the select keys 16aa which are displayed in rectangular shape at the left-hand side of the name of each landmark, as shown in FIG. 19(A). These select keys 16n function as a "selection means."

If none of the select keys 16aa is touched, the routine advances from step S358 to step S360, where it is decided whether or not the page scroll key 16z is touched. If this page scroll key 16z is not touched, the decision is NO in step S360, and the routine is quickly returned to step S358. If, on the contrary, the page scroll key 16m is operated, the routine advances from step S360 to step S362, whereby the screen of the display 22a is switched so that names of landmarks not displayed before operation of the page scroll key 16z are listed and displayed on the display 22a, and the routine is then returned to step S358.

Each time the beginning sound (syllable) of the names of the landmarks enumerated and displayed in the KANA syllabic order changes, the KANA name expressing the beginning sound of the landmark name is displayed in the select key 16aa corresponding to the first landmark having the new (different) sound. Moreover, the display screen may be switched by touching the page scroll key 16z displayed as the "KANA SYLLABARY" so that the landmark corresponding to the select key 16aa having a name with a new beginning sound is displayed at the top of the listing.

Figure 19B:
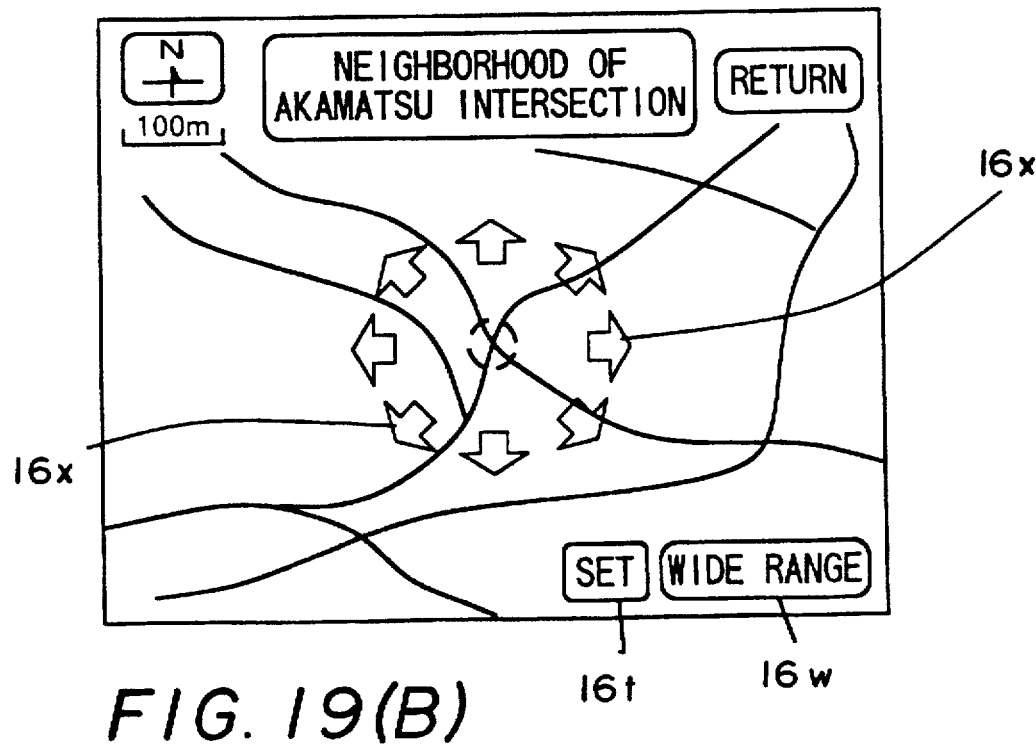
FIG. 19(B) is a display screen representing an output of data corresponding to the lowest level of the hierarchy of data utilized in the third embodiment of the present invention.

When a landmark is selected by touching a select key 16aa, the decision is YES in step S358, and the routine advances to step S364. In step S364, the data group set of the landmark point list providing the basis for generating the display 22a at step S356, the point E.L. & N.L. data and the map display scale data, within the data group identified by the landmark point name data of the selected landmark, are used to retrieve predetermined map data from that stored in the external storage unit 18, and the retrieved map data is processed to generate display of a map of the vicinity around the location of the selected landmark on the display screen 22a, as shown in FIG. 19(B). At the time of executing this step S364, the control section 24 functions as the "retrieve means" of the present invention.

Incidentally, in the case of the map screen shown in FIG. 19(B), also, the scale of reduction of the map being displayed can be switched to a wider range map by touching the wide range key 16w, as has been described with reference to FIG. 18(A), and the map can be scrolled by touching the scroll key 16x.

After execution of step S364, the neighborhood retrieving step is ended, and the routine is returned to step S322, where it is decided whether nor not the set key 16t is touched, as described before. If it is decided that the set key 16t has not been operated, the operation of step S322 is repeated to await operation of the set key 16t. If this set key 16t is operated, the decision is YES in step S322, and the routine advances to step S324, where the position of a landmark on the map being displayed on the display screen 22a is set as the destination. After this, the destination setting step is ended, and the routine subsequently advances to step S80 of FIG. 6, where the aforementioned route searching is executed.

The routine preceding generation of the map display of the vicinity around the location will now be described with reference to FIGS. 16(A), 17(B), 18(A) and 18(B).

Specifically, an unregistered telephone number such as "0566991111", which is not stored in the external storage unit 18, is input using the ten-key display screen shown in FIG. 16(A). Then, the area code/local exchange number data "056699" is retrieved from the area code/local exchange list. Since, however, the data indicating the subscriber's number "1111" is not in the data group set for subscriber numbers belonging to "056699" (that is, NO at S318), the messages, as shown in FIG. 10(B) are displayed on the display screen 22a. After this, the predetermined representative point E.L. & N.L. data, in the same data group as that of the area code/local exchange number data indicating "056699", is processed to generate a map display of the vicinity around the representative point of ANJO CITY, AICHI PREFECTURE on the display screen 22a (at S326).

When the neighborhood retrieve key 16u is touched, all the genre name data in the data group set for the landmark genre list read out from the external storage unit 18, on the basis of the landmark genre address & size data in the same data group as that of the toll/local office number data indicating "056699," are processed to generate the display of genre keys 16y labelled "INTERSECTION", "TOWN NAME", "STATION" and "OFFICE", i.e. classifications of landmarks existing in ANJO CITY or in the area assigned to the number "056699," and enclosed by rectangles (at S352).

When, for example, the genre key 16y for "INTERSECTION" is touched, of the data group set of the landmark genre list belonging to "056699", the point name data and the point name rendering data in the data group set of the landmark point list read out from the external storage unit 18, on the basis of the landmark point address & size data in the same data group as that of the genre name data indicating the "INTERSECTION," are processed to list and display all the intersection names existing in ANJO CITY on the display screen 22a, in KANA syllabic order, as shown in FIG. 19(A).

When the select key 16aa labelled "AKAMATSU" is touched, moreover, the point E.L. & N.L. data and the map display scale data in the same data group as the point name data indicating "AKAMATSU" are utilized to locate predetermined map data in the external storage unit 18 and to retrieve that located map data, and this retrieved map data is processed to generate a display of a map of the vicinity around the AKAMATSU INTERSECTION in ANJO CITY, as shown in FIG. 19(B).

As has been described in detail hereinbefore, according to this third embodiment, even if an unregistered telephone number is input, which is not stored in the external storage unit 18, by executing the neighborhood retrieval routine by touching the neighborhood retrieve key 16u, the genre names for landmark classifications located in the area assigned to the local exchange number can be listed and displayed (at S352). Then, by touching a genre key 16y for one landmark classification can be listed and displayed (i.e., YES at S354, and at S356); and by touching a select key 16aa one of the listed landmark can be selected for display of a map of the vicinity around that selected landmark.

As a result, according to this third embodiment, even in the case where the telephone number used to input the destination location is not stored as telephone number data (i.e., area code/local exchange number data+subscriber's number data) in the external storage unit 18, the area in the neighborhood of the point corresponding to the telephone number, as predetermined for the input local exchange number, is selected. Landmarks identified as being located in the selected area are retrieved on the basis of the landmark genre address & size data and the landmark point address & size data in the area code/local exchange number list. By processing the retrieved data, landmarks are listed and displayed on the display screen 22a for selection by the operator to then display a map of the vicinity around the location of the selected landmark. By operating the wide range key 16i and the scroll key 16x, the desired destination can be easily searched and located on the map, using the position of the landmark as a clue.

By operating the set key 16t with the map of the vicinity of the selected landmark displayed on the display screen 22a, moreover, the landmark position is set as a tentative destination for purposes of execution of route retrieval and that destination may be reached under guidance of the navigation system 10. After this, the desired destination may be located with ease by using the landmark location as a clue.

Even if none of the listed and displayed landmarks are known to the operator, a landmark, e.g., a station or city office in the neighborhood of the desired destination, which can provide information as to the location of the desired destination, if actually telephoned, is selected and set as a tentative destination so that the vehicle can be guided to the tentative destination. According to this third embodiment, it is easy to obtain help in reaching the desired destination.

While this third embodiment has been described as a destination setting step, it can also be applied to a case wherein the location of a point or area is input in a form other than a telephone number, with the technique of this third embodiment providing a clue for help in reaching the desired location in the form of providing a landmark in its general area as an interim destination.

In the third embodiment as described, the location of a selected landmark is retrieved by executing S312 through steps S364, and a map of the vicinity around the location of the landmark is displayed on the display screen 22a on the basis of the retrieved position. If the set key 16t is touched, the location of the landmark is set as the destination, and the routine shifts to the execution of the route searching step. However, the procedures of displaying the map of the vicinity around the selected position and setting the destination by operating the set key 16t may be omitted, and the position of the landmark may be set as the destination instantly as the select key 16aa is touched, so that the procedure may be subsequently shifted to the execution of the route searching steps. Further, while the foregoing describes guidance through the display screen and by voice during vehicle travel along the route determined by execution of the route searching steps, guidance for vehicle travel can be by voice only without using the display screen.

Further, while this third embodiment of destination setting has been described for landmarks within the four genres of intersection, town name, station and town office, operation of the routine is not limited to those four genres but may use any genre of landmarks for searching for a destination such as a school, police station, post office or bank. Suitable landmarks are exemplified by the items described in the remarks of commercially available printed maps.

The genres of landmarks may be vertically listed and displayed on the display screen 22a, as shown in FIG. 19(A) in the order of the size of each classification of landmarks, i.e., beginning with the largest classification in terms of occupied storage capacity for landmark point address & size data.

As in the case of "TOWN NAME" used as an example of landmark classification, the landmark need not always actually be a predetermined point but may be a conceptional point or an area of predetermined size or extent such as a park. The landmark location information for indicating the position of the landmark extending over a predetermined area may be keyed to the geographical center of the area of the landmark, so that the landmark may be displayed in its entirety in the map displayed on the display screen.

Further, while landmark names are listed and displayed as shown in FIG. 19(A), instead of landmark names, photographs or diagrams depicting the landmarks, drawings, abbreviations or pet names may be displayed to identify the landmarks. In this manner, an operator ignorant of the formal names of landmarks can be conveniently acquainted with the landmarks by the display of photographs or the like indicating the appearances of the landmarks.

In describing the third embodiment, for sake of convenience of the control section 24 in reading data from the external storage unit 18, the address & size data are organized in correspondence to entries on the area code/local exchange number list, and the landmark genre list and the landmark point list are individually contained in the area code/local exchange number list and the landmark genre list. However, storage of address & size data may be omitted if the rate at which the CPU reads and processes the data from the external storage unit is sufficiently high, the point E.L & N.L. data, indicating the positions of the landmarks, the data of the landmark names, the rendering of the names and the map display scale are all stored, and the landmarks located in the area assigned to the input number are directly retrieved on the basis of the point E.L. & N.L. data indicated by the positions of the landmarks. In this manner the genre names and the names of the landmarks may be listed and displayed on the basis of the stored data for both the genre names and the landmark names.

Further, while the third embodiment has been described in connection with input of a telephone number, it is also applicable to input of an address and to input by touching a point on the map being displayed. If data indicating the input address or data indicating the position of the point touched on the map is not found in storage, either all the landmarks existing in the "TOWN OR VILLAGE SECTION" of the input address or in the map region will be displayed, and the displayed map will be the map for the vicinity around the landmark selected.

While, the various embodiments have been described in connection with the vehicular navigation system 10, these embodiments are not limited in their application to a vehicular navigation system but, rather, can be applied to any input of instructions corresponding to a hierarchical menu to be displayed by a display unit. More specifically, the menu selection of the present invention can be used in combination with a personal computer or word processor, with display of a plurality of menus such as "calculations", "list management" or "communications" in combination with a menu for lower hierarchy. Even in a personal computer or word processor having such functions installed, only one or two menus are frequently selected by the user. Therefore, the present invention may be employed to display in advance that menu of the lower hierarchy having a history of most frequent use, together with a menu of the predetermined higher hierarchy so that the menu selecting operation can proceed with improved efficiency. By the same reasoning, the efficiency of menu selecting can be improved by employing the present invention in multimedia terminal systems having all the functions of a portable personal computer, a portable telephone, a word processor, a portable TV or a TV game machine, in which menus for selecting the individual functions of those terminal systems are displayed on a display screen; systems such as facsimile or copying machines having a display section for hierarchically displaying menus so that an instruction can be inputted according to the selected menu; home information terminal systems for home shopping or the like; and public information terminal systems located at a town corner, a station or a town office for providing guidance or services, such as an automatic vendor, an electronic book seller or a ticket seller.

While the various embodiments have been described as having input means in the form of the touch switches which are formed on the screen of the display 22a, the input means are not limited to touch switches but may be any conventional means capable of inputting an instruction for selection of one of a plurality of menu items displayed in the display unit. For example, in case a cursor on the display screen is moved to select a menu by means of a mouse or cursor key, the selecting instruction may be input by a button switch, pen or voice.

Moreover, even if the menus of icons used in the personal computer or CAD are hierarchically displayed, the operation efficiency can be improved by employing the present invention.

In the foregoing embodiments, moreover, the display screens are switched, each time the hierarchies of the menus to be displayed are changed by selecting some menu. However, the present invention is not so limited and also contemplates embodiments wherein the hierarchical menus are overlapped in multiple layers such that the menus of the lower hierarchy are displayed to partially cover the menus of the higher hierarchy in multiple layers, and wherein the menus of higher and lower hierarchies are simultaneously displayed in one screen.

In the foregoing embodiments, as shown in FIG. 3(B), the "other facilities" menu 16e ("menu of a predetermined hierarchy") and the first genre menu 16d ("menu of the lower hierarchy") are displayed together juxtaposed and are enclosed by a frame captioned "NAME OF FACILITIES" so that their relationship can be understood. However, again, the present invention is not so limited and can use any display mode, provided not only the menu of a predetermined hierarchy but also at least one menu of a lower hierarchy corresponding to the former menu is displayed. Preferably, however, the menu of the lower hierarchy to be displayed together with the menu of the predetermined hierarchy are arranged to clearly show that it corresponds to the menu of the predetermined hierarchy. The relationship between the two menus as displayed may be indicated by connecting the two menus, by making the sizes of the menus different or by displaying the two menus in different colors.

As described hereinbefore, the "fourth control means" operates to display, not only a menu in a predetermined hierarchy, but also at least one of a plurality of corresponding menus in a lower hierarchy. If the menu of the lower hierarchy being displayed is selected predetermined hierarchy, a menu for the next lower hierarchy can be displayed. Thus, instruction for a selection from the menu of the predetermined hierarchy can be omitted to improve the efficiency of the menu selecting operation. Moreover, a representative one of the menus of the lower hierarchy can be displayed together with the menu of the predetermined hierarchy. Then, with the menu of the predetermined hierarchy being displayed, the content of the lower hierarchy can be roughly recognized to increase the information basis for thereby to make the menu judging the menu selection, thereby making the menu selection more convenient.

The "learning means" of the present invention "learns" each time any of the plurality of menus for the lower hierarchy, corresponding to the menu of the predetermined hierarchy, is selected by operation of the input means and, on the basis of this "learning", automatically selects at least one of the plurality of menus in the lower hierarchy for display together with the menu of the predetermined hierarchy. Composing the initial menu display in this manner reflects the "learned" results of past selections so that the efficiency of the menu selection process can be further improved.

Vehicular guidance information outputting systems frequently use a small sized display unit, which cannot display all the numerous menus belonging to the same hierarchy, so that switching a plurality of screens is required for displaying all those menus. Therefore, the present invention is particularly advantages when applied to a vehicular guidance information outputting system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A vehicle navigation system for guiding a user to a destination selected by using a hierarchical menu arrangement, comprising a display unit for displaying information including selectable items of a menu;

a storage unit for storing data including a hierarchical arrangement of a plurality of menus in at least three levels wherein (a) a first level of the hierarchical arrangement includes a first level menu having a plurality of selectable items of general categories, (b) a second level of the hierarchical arrangement includes a plurality of second level menus each having a plurality of selectable items of more specific categories, each second level menu relating to a corresponding general category of the first level menu, and (c) a third level of the hierarchical arrangement includes a plurality of third level menus each having a plurality of selectable items of instructions, each third level menu relating to a corresponding specific category of a menu of the second level menus;

said first, second and third levels of the hierarchical arrangement defining progressively lower levels;

input means for selecting an item from a menu displayed by the display unit;

first control means responsive to selection of an item of instruction of the third level by the input means for executing a corresponding instruction;

second control means for operating the display unit to display selectable items including a menu of selectable items of the hierarchical arrangement;

third control means for controlling the second control means to display successive menus of selectable items based upon the data stored in the storage unit and in accordance with the hierarchical arrangement beginning with the first level and progressing sequentially to the second and third levels in response to corresponding items input by the input means; and fourth control means responsive to the display of a higher level menu for controlling the second control means to display a selectable item of a lower level menu within the higher level menu based upon predetermined information to enable selection of said selectable lower level menu item by said input means to bypass one or more lower levels of menus.

2. A vehicle navigation system as claimed in claim 1, further comprising learning means responsive to said input means inputting each lower level menu item for determining a most selected lower level menu item; said most selected lower level menu item being said predetermined information used by said fourth control means to display the most selected lower level menu item as said selectable lower level menu item.

3. A vehicle navigation system as claimed in claim 1 wherein the items of instruction of the third level menus include destinations, and the first control means includes means for computing and displaying guiding information to a destination selected from a third level menu.

4. A destination setting system, for use in a vehicular navigation apparatus, said system comprising a storage unit for storing data including a hierarchical arrangement of a plurality of menus in at least two levels including (a) a higher hierarchical level menu having a plurality of first selectable items of general categories, and (b) a plurality of lower hierarchical level menus each including a plurality of second selectable items more specific than said first selectable items, each lower hierarchical level menu relating to a corresponding general category of said higher hierarchical level menu;

a display unit for displaying information including said menus;

main menu means for displaying, on said display unit, a main menu identifying said higher hierarchical level menu and at least one of said lower hierarchical level menus;

first select means for selecting said higher hierarchical level menu from said main menu;

second select means for selecting said one lower hierarchical level menu from said main menu;

higher hierarchical level menu means for displaying, on said display unit, said higher hierarchical level menu on said display unit, responsive to operation of said first select means;

a plurality of third select means for selecting one of said first selectable items from the displayed higher hierarchical level menu;

second hierarchical level menu means for displaying, on said display unit, one of said lower hierarchical level menus for the general category of the first selectable item selected by operation of one of said third select means or by operation of said second select means;

a plurality of fourth select means for selecting one of said second selectable items from the displayed one lower level menu.

5. The destination setting system of claim 4, further comprising: learning means for determining one of said first selectable items being most often selected, over a given period of time for setting said one first selectable item as said at least one of said lower hierarchical level menus identified in said main menu.

6. The destination setting system of claim 4 wherein said main menu means further identifies telephone number input means and further comprising:

means for inputting a telephone number inclusive of a multi-digit local exchange number portion and, following said local exchange number portion, a multi-digit subscriber number portion; wherein the data stored in said storage unit further includes first information items correlated with subscriber portions of telephone numbers, data for landmark information correlated with local exchange portions of telephone numbers, and map data;

first detection means for detecting if information data corresponding to the local exchange portion of the input telephone number is stored in said storage unit;

second detection means, responsive to a positive determination by said first detection means, for determining if the subscriber portion of said input telephone number is correlated with information data in said storage unit;

first retrieve means, responsive to a positive determination by said second detection means, for retrieving map data and displaying, on said display unit, a map of the vicinity of an address corresponding to said input telephone number;

second retrieve means, responsive to a negative determination by said second detection means, for retrieving landmark data corresponding to the local exchange portion of said input telephone number from said storage unit;

landmark identification means for identifying, based on the landmark data retrieved by said second retrieve means, landmarks within an area assigned to the local exchange portion of said input telephone number;

select means for selecting one of said landmarks identified by said landmark identification means; and third retrieve means for retrieving map data corresponding to the selected landmark and for generating a map display, on said display unit, of the vicinity of said selected landmark.

7. A destination setting system, for use in a vehicular navigation apparatus, said system comprising a storage unit for storing data including a hierarchical arrangement of data for a plurality of menus in at least two levels including (a) a higher hierarchical level having a plurality of first selectable items of general categories, and (b) a lower hierarchical level including a plurality of groups of second information more specific than said first selectable items, each group of second information relating to a corresponding general category of said higher hierarchical level;

a display unit for displaying information including first and second menus which are contained in a hierarchy of menus wherein (a) said first menu lists at least one of said first selectable items along with an identification of said second menu, and (b) said second menu lists the first selectable items other than the at least one first selectable item listed in said first menu;

first select means active during display of said first menu and responsive to selection of said identification of said second menu for advancing said display unit to display said second menu;

second select means active during display of said first menu and responsive to selection of a first selectable item from said at least one first selectable item listed in said first menu to advance said display unit to skip display of the second menu and to display the group of second information corresponding to the first selectable item selected by said second select means;

third select means active during display of said second menu and responsive to selection of one of said first selectable items from the second menu to advance said display unit to display the group of second information corresponding to the first selectable item selected by said third select means; and learning means responsive to said third select means for setting the first selectable item selected by the third select means as at least one of said first selectable items in said first menu.

8. The destination setting system of claim 7, wherein said learning means responds to the first selectable item selected by the third select means being most often selected by the third select means a plurality of times, over a given period of time, for setting the first selectable item selected by the third select means as at least one of said first selectable items in said first menu.

9. The destination setting system of claim 7 wherein said first menu further identifies telephone number input means and further comprising:

means for inputting a telephone number inclusive of a multi-digit local exchange number portion and, following said local exchange number portion, a multi-digit subscriber number portion; wherein the data stored in said storage unit further includes first information items correlated with subscriber portions of telephone numbers, data for landmark information correlated with local exchange portions of telephone numbers, and map data;

first detection means for detecting if information data corresponding to the local exchange portion of the input telephone number is stored in said storage unit;

second detection means, responsive to a positive determination by said first detection means, for determining if the subscriber portion of said input telephone number is correlated with information data in said storage unit;

first retrieve means, responsive to a positive determination by said second detection means, for retrieving map data from said storage unit and for displaying, on said display unit, a map of the vicinity of an address corresponding to said input telephone number;

second retrieve means, responsive to a negative determination by said second detection means, for retrieving landmark data corresponding to the local exchange portion of said input telephone number from said storage unit;

landmark identification means for identifying, based on the landmark data retrieved by said second retrieve means, landmarks within an area assigned to the local exchange portion of said input telephone number;

select means for selecting one of said landmarks identified by said landmark identification means; and third retrieve means for retrieving map data corresponding to the selected landmark and for generating a map display, on said display unit, of the vicinity of said selected landmark.

* * * * *